United States Patent
Hidaka et al.

(10) Patent No.: US 7,020,453 B2
(45) Date of Patent: Mar. 28, 2006

(54) HIGH-FREQUENCY SWITCH CIRCUIT AND MOBILE TELECOMMUNICATIONS TERMINAL DEVICE USING THE SAME

(75) Inventors: Kenichi Hidaka, Takatsuki (JP);
Tadayoshi Nakatsuka, Toyonaka (JP);
Atsushi Suwa, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 34 days.

(21) Appl. No.: 10/489,816

(22) PCT Filed: May 21, 2003

(86) PCT No.: PCT/JP03/06365

§ 371 (c)(1),
(2), (4) Date: Mar. 17, 2004

(87) PCT Pub. No.: WO03/107551

PCT Pub. Date: Dec. 24, 2003

(65) Prior Publication Data

US 2004/0242182 A1 Dec. 2, 2004

(30) Foreign Application Priority Data

May 31, 2002 (JP) ............................... 2002-158908

(51) Int. Cl.
*H04B 1/28* (2006.01)

(52) U.S. Cl. .................. 455/333; 455/575.7; 455/550.1
(58) Field of Classification Search .............. 455/333, 455/73, 78, 121, 129, 193.1, 127.1, 550.1, 455/575.7, 575.1, 552.1; 257/20, 24, 27, 257/192, 368, 369; 343/777, 876
See application file for complete search history.

(56) References Cited

U.S. PATENT DOCUMENTS

| 5,426,334 | A | 6/1995 | Skovmand |
| 5,659,885 | A | 8/1997 | McDonald et al. |
| 5,878,331 | A | 3/1999 | Yamamoto et al. |
| 6,548,838 | B1 * | 4/2003 | Anda et al. .................. 257/192 |
| 6,573,529 | B1 * | 6/2003 | Asano et al. .................. 257/20 |

(Continued)

FOREIGN PATENT DOCUMENTS

EP 0225644 A 6/1987

(Continued)

OTHER PUBLICATIONS

European Search Report dated Sep. 30, 2004.

(Continued)

*Primary Examiner*—Sonny Trinh
(74) *Attorney, Agent, or Firm*—Stevens, Davis, Miller & Mosher, LLP

(57) ABSTRACT

An object is to provide an antenna switch semiconductor integrated circuit which reduces a consumption current. To this end, of two control input signals which are fed to a logic circuit which controls turning on and off of a plurality of switching FETs, a control input signal for switching between a sending mode and a receiving mode is fed to an oscillation circuit, thereby making the oscillation circuit operate only during the sending mode under which the logic circuit needs a high voltage. A voltage raising circuit accordingly operates, whereby a raised voltage is supplied to the logic circuit. During the receiving mode, the oscillation circuit stops, and the voltage raising circuit stops. With a switch turned on using the logic circuit, a power source voltage is supplied directly to the logic circuit when the voltage raising circuit is not in operation. This shortens the operation time of the voltage raising circuit and reduces the consumption current.

20 Claims, 13 Drawing Sheets

U.S. PATENT DOCUMENTS

| | | | |
|---|---|---|---|
| 6,657,266 B1 * | 12/2003 | Hirai et al. | 257/393 |
| 6,882,210 B1 * | 4/2005 | Asano et al. | 327/403 |
| 6,912,406 B1 * | 6/2005 | Lahlum et al. | 455/553.1 |
| 6,914,280 B1 * | 7/2005 | Asano et al. | 257/275 |
| 6,933,543 B1 * | 8/2005 | Mun et al. | 257/194 |
| 2003/0153348 A1 * | 8/2003 | Lahlum et al. | 455/550 |
| 2004/0217914 A1 * | 11/2004 | Yamashita et al. | 343/850 |

FOREIGN PATENT DOCUMENTS

| | | |
|---|---|---|
| EP | 0225644 A2 | 6/1987 |
| JP | 62137925 | 6/1987 |
| JP | 63212226 | 9/1988 |
| JP | 02017786 | 1/1990 |
| JP | 04127620 | 4/1992 |
| JP | 11055156 | 2/1999 |
| JP | 2000068807 | 3/2000 |

OTHER PUBLICATIONS

Patent Abstracts of Japan vol. 1999, No. 5, May 31, 1999 & JP 11 055156 A (New Japan Radio Co Ltd), Feb. 26, 1999.
Patent Abstracts of Japan col. 0141, No. 61 (E-0909), Mar. 28, 1990 & JP 2 017786 A (Sharp Co.) Jan. 22, 1990.
PCT International Search Report dated Oct. 21, 2003.

* cited by examiner

FIG. 4

| PATH | CONTROL INPUT SIGNAL | | SWITCH | | | | | | | | |
|---|---|---|---|---|---|---|---|---|---|---|---|
| | INA | INB | 4 | 5 | 6 | 7 | 8 | 9 | 10 | 11 |
| FIRST EXTERNAL SIGNAL TERMINAL→ANTENNA | H | H | H | L | L | L | L | H | H | H |
| SECOND EXTERNAL SIGNAL TERMINAL→ANTENNA | H | L | L | L | H | L | H | H | L | H |
| THIRD EXTERNAL SIGNAL TERMINAL→ANTENNA | L | H | L | H | L | L | H | L | H | H |
| FOURTH EXTERNAL SIGNAL TERMINAL→ANTENNA | L | L | L | L | L | H | H | H | H | L |

HIGH-FREQUENCY SWITCH CIRCUIT AND MOBILE TELECOMMUNICATIONS TERMINAL DEVICE USING THE SAME

FIELD OF THE INVENTION

The present invention relates to a high-frequency switch circuit which is formed by a semiconductor integrated circuit and used in a mobile telecommunications terminal device such as a mobile telephone and a radio telecommunications device, and more particular, to such a high-frequency switch circuit which reduces consumption current in particular and is capable of handling a high output. The high-frequency switch circuit is used for switching of a signal path for an antenna for instance.

The present invention relates also to a mobile telecommunications terminal device which is formed using such a high-frequency switch circuit as above. The invention is suitable to a mobile telecommunications terminal device such as a multi-mode mobile telephone which can use different access methods.

BACKGROUND OF THE INVENTION

These days, mobile telecommunications businesses such as automotive telephones and mobile telephones are developing dramatically. In many countries in the world, various mobile telecommunications systems are already in service.

Access methods for mobile telephones currently include TDMA (Time Division Multiple Access) and CDMA (Code Division Multiple Access).

The TDMA standards include PDC (Personal Digital Cellular) used in Japan, EGSM (Extended Global System for Mobile Communications) and GSM1800 (Global System for Mobile Communications 1800) mainly used in Europe, and DAMPS (Digital Advanced Mobile Phone Service) mainly used in the United States of America.

Meanwhile, the typical CDMA standards are IS-95 (Interim Standard-95) and W-CDMA (Wide-band CDMA).

In these mobile telecommunications systems, signal processing parts of many mobile terminals use semiconductor field-effective transistors (FETs). Particularly for mobile terminals for which the portability is the most important, monolithic microwave ICs (MMICs) using GaAsFETs are under vigorous development. An MMIC is a semiconductor integrated circuit element which can realize a compact size, low-voltage driving and low consumption energy at the same time.

Among such semiconductor integrated circuits, development of high-frequency switch circuits which switch a path for a high-frequency signal particularly within a mobile terminal is becoming important.

Specific examples of switching of a path for a high-frequency signal include switching of a path for supplying a high-frequency signal received at an antenna to a receiver part and switching of a path for outputting a high-frequency signal which has been outputted from a sender part to an antenna.

Further, specific examples of switching of a path for a high-frequency signal within a multi-mode mobile telephone which comprises a plurality of sender parts and a plurality of receiver parts include, in addition to the switching described above, switching of a path for connecting one of the plurality of sender parts with an antenna and switching of a path for connecting one of the plurality of receiver parts with the antenna. In addition, since a mobile telephone comprises a plurality of antennas, that is, an internal antenna and an external antenna, switching of a signal path also include switching of a path to selectively use the plurality of antennas.

By the way, in order to use an FET as a switching device for switching of a signal path, it is necessary to control a bias voltage which is applied upon a gate terminal of the FET. For example, when a gate bias which is sufficiently higher than a pinch-off voltage is applied upon the gate terminal, a low impedance develops between the drain and the source and the FET is controlled to the ON-state. On the contrary, when a gate bias which is sufficiently lower than the pinch-off voltage is applied upon the gate terminal, a high impedance develops between the drain and the source and the FET is controlled to the OFF-state.

In this manner, a voltage at a gate terminal of a GaAsFET is changed, thereby switching a signal path and realizing the function of an antenna switch.

One example of a switch circuit having such a structure is an SPDT (Single Pole Dual Throw) switch which is formed by combining one series FET and one shunt FET for a signal path. This structure allows the shunt FET which is in the ON-state to draw an RF (Radio Frequency) signal leaking through a capacitance component from the series FET which is in the OFF-state to the ground, and hence, provides high isolation.

Meanwhile, a digital mobile telephone complying with the TDMA telecommunication method uses a DPDT (Dual Pole Dual Throw) switch for switching between an accessory antenna and an external antenna and for switching between a sender part and a receiver part which are disposed within the mobile telephone.

A DPDT switch is formed using an FET, and comprises a first and a second input terminals and a first and a second output terminals. The DPDT switch switches between outputting of a signal from the first and the second input terminals respectively to the first and the second output terminals and outputting of a signal from the first and the second input terminals respectively to the second and the first output terminals.

In these switches, for the purpose of operating the FET, a voltage equal to or higher than the pinch-off voltage is applied upon the FET and a low impedance develops, while a voltage equal to or lower than the pinch-off voltage is applied upon the FET and a high impedance develops, as described earlier.

The maximum sending power (Pmax) which can be handled when an FET is used as a switching element is expressed by the following equation:

$$P\text{max} = 2|Vc - Vp|^2 / Z$$

Vc: the control voltage at the gate terminal
Vp: the pinch-off voltage
Z: the load impedance Hence, in order to increase the maximum sending power, the difference between the control voltage at the gate terminal (Vc) and the pinch-off voltage (Vp) may be increased.

However, as for voltages of batteries for mobile telephones, there is a limit against an increase of the difference between the gate terminal control voltage (Vc) and the pinch-off voltage (Vp), and therefore, it is not possible to obtain sufficient maximum sending power.

It is a voltage raising circuit that is necessary to increase the gate terminal control voltage (Vc). If a voltage of a battery of a mobile telephone is used as it directly is, the gate terminal control voltage (Vc) will be restricted up to the battery voltage. However, use of a voltage raising circuit makes it possible to increase the voltage of the gate terminal control voltage (Vc) beyond the battery voltage. In this manner, it is possible to ensure a large difference between the gate terminal control voltage (Vc) and the pinch-off voltage (Vp). From these, use of a voltage raising circuit is important in order to eliminate the restrictions related to the maximum sending power.

An antenna switch semiconductor integrated circuit using a voltage raising circuit is one described in Japanese Patent Application Laid-Open Gazette No. H11-55156, for instance. In this antenna switch semiconductor integrated circuit, there are a decoder circuit, a drive circuit, an oscillation circuit and a double voltage generator circuit disposed on an MOS integrated circuit semiconductor chip. As the double voltage generator circuit is used, a voltage supplied from outside can be changed internally to a desired high voltage.

Use of the double voltage generator circuit thus makes it possible to internally obtain a high voltage, and hence, increase the gate terminal control voltage (Vc). Hence, the maximum sending power (Pmax) can be enhanced. This allows fabrication of an antenna switch semiconductor integrated circuit which is capable of handling a high output.

Other example of a conventional antenna switch semiconductor integrated circuit may have a structure shown in FIG. 13 for example. Operations of a conventional antenna switch semiconductor integrated circuit will now be described with reference to FIG. 13.

First, a GaAs semiconductor chip 2 and an Si semiconductor chip 3 are mounted on an IC package, and these operate as an antenna switch semiconductor integrated circuit.

Switches 4 through 7 are formed by GaAsFETs and fabricated on the GaAs semiconductor chip 2. These switches 4 through 7 are connected with external signal terminals 24 through 27 and an antenna 28 via external capacitors 19 through 23.

Further, switches 8 through 11 are formed by GaAsFETs and fabricated on the GaAs semiconductor chip 2. One ends of these switches 8 through 11 are connected between the switches 4 through 7 and the external capacitors 19 through 22, and the other ends of the switches 8 through 11 are grounded via capacitances 12 through 15.

In this structure, when a signal path from the external signal terminal 24 to the antenna 28 is to conduct for instance, the switches 4 and 9 through 11 are turned on and the remaining switches 5 through 8 are turned off. This causes the signal path from the external signal terminal 24 to the antenna 28 to conduct and provides sufficient isolation from the remaining external signal terminals 25 through 27.

Control of these switches 4 through 11 is realized by a logic circuit 17 which is formed on the Si semiconductor chip 3. To be specific, in accordance with the states of a plurality of control input signals INA and INB fed to control terminals 29 and 30, the logic circuit 17 selectively makes the switches 4 through 11 conduct.

An ordinary antenna switch semiconductor integrated circuit can be controlled using these structures. However, for the purpose of controlling a high output signal, the maximum sending power (Pmax) needs be increased as described above. To this end, it is necessary to increase the gate terminal control voltage (Vc) at the switches 4 through 11. Hence, a voltage raising circuit 16 is necessary.

The voltage raising circuit 16 performs a voltage raising operation based on an oscillation signal which is supplied from an oscillation circuit 18C. The voltage raising circuit 16 is formed on the Si semiconductor chip 3, together with the oscillation circuit 18C and the logic circuit 17. Although a specific structure of the oscillation circuit 18C will not be described here, the oscillation circuit 18C is realized by adding a power source voltage to a terminal 108 at all times in the structure which is shown in FIG. 2 for example.

Based on the oscillation signal from the oscillation circuit 18C described above, the voltage raising circuit 16 internally raises an external voltage supplied through a power source voltage terminal 31, and then supplies thus raised voltage to the logic circuit 17 as an operation power source voltage. In this fashion, it is possible to obtain a high output voltage from the logic circuit 17. Using this voltage as the gate terminal control voltage (Vc), a high output signal can be controlled.

The structure according to the conventional example above uses a voltage raising circuit in order to obtain a high voltage. However, where a voltage raising circuit is used to obtain a high voltage, the voltage raising circuit is always operating instead of operating only at the time of sending which demands a high voltage. Because of this, a current needed to operate the voltage raising circuit is always flowing in the antenna switch semiconductor integrated circuit. Hence, if the antenna switch semiconductor integrated circuit is incorporated within a mobile telephone, the mobile telephone will consume more current than needed and a standby time and a call time of the mobile telephone will be shortened.

SUMMARY OF THE INVENTION

An object of the present invention is to provide a high-frequency switch circuit and a mobile telecommunications terminal device which can reduce a consumption current.

A high-frequency switch circuit according to a first invention comprises: a plurality of switching field-effective transistors; a logic circuit under whose control the plurality of switching field-effective transistors conduct and shut themselves down in accordance with the state of a control input signal which is supplied from outside; a voltage raising circuit which raises a power source voltage, which is applied upon a power source voltage terminal from outside, and supplies the same to the logic circuit as an operating power source voltage; an oscillation circuit which operates, supplies an oscillation signal to the voltage raising circuit and makes the voltage raising circuit operate when the control input signal enters a particular state, but stops operating and stops the voltage raising circuit when the control input signal enters other state than the particular state; and a switch which is connected between the power source voltage terminal and an output terminal of the voltage raising circuit, characterized in that the switch is disconnected when the control input signal enters the particular state, and the switch conducts when the control input signal enters other state than the particular state.

Where this structure is used, with the operation of the oscillation circuit controlled in accordance with the control input signal, the voltage raising circuit operates and a raised voltage is hence fed to the logic circuit in the event that the control input signal is in the particular state. Meanwhile, when the control input signal is in other state than the particular state, the power source voltage is fed to the logic circuit without operating the voltage raising circuit. Noting this, when control of high power is needed, the control input signal is made enter the particular state, and when control of high power is not needed, the control input signal is made enter other state than the particular state. In this manner, the voltage raising circuit operates and high power is controlled when control of high power is needed, whereas when control of high power is not needed, the voltage raising circuit is stopped. As a result, control of high power is achieved, thereby reducing consumption power as a whole.

Further, since the switch connected between the power source voltage terminal and the output terminal of the voltage raising circuit conducts when the voltage raising circuit is not in operation, the operating power source voltage fed to the logic circuit will not become lower than the power source voltage which is supplied from outside, and therefore, the operations of the logic circuit and the switching operations of the switching field-effective transistors will not become instable.

In the high-frequency switch circuit according to the first invention, the plurality of switching field-effective transistors have a structure which selectively causes one path out of a signal path for sending and a signal path for receiving which lead to an antenna to conduct in accordance with the state of the control input signal. In this structure, the logic circuit selectively causes the signal path for sending to conduct when the control input signal enters the particular state, and the logic circuit selectively causes the signal path for receiving to conduct when the control input signal enters other state than the particular state.

Where this structure is used, the voltage raising circuit operates when the signal path for sending which requires control of high power is to conduct, and when the signal path for receiving which does not need control of high power is to conduct, the voltage raising circuit stops operating.

Further, in the high-frequency switch circuit according to the first invention, the plurality of switching field-effective transistors are formed on a semiconductor chip of gallium arsenide, the logic circuit, the voltage raising circuit, the oscillation circuit and the switch are formed on a semiconductor chip of silicon. The semiconductor chip of gallium arsenide and the semiconductor chip of silicon are housed within the same package.

A high-frequency switch circuit according to a second invention comprises: a plurality of switching field-effective transistors; a first logic circuit under whose control the plurality of switching field-effective transistors conduct and shut themselves down in accordance with the states of a plurality of control input signals which are supplied from outside; a voltage raising circuit which raises a power source voltage, which is applied upon a power source voltage terminal from outside, and supplies the same to the first logic circuit as an operating power source voltage; an oscillation circuit which supplies an oscillation signal to the voltage raising circuit and makes the voltage raising circuit operate; a switch which is connected between the power source voltage terminal and an output terminal of the voltage raising circuit; and a second logic circuit which makes the oscillation circuit operate and disconnect the switch when the plurality of control input signals enter a particular state, but stops the oscillation circuit and causes the switch to conduct when the plurality of control input signals enter other state than the particular state.

Where this structure is used, by means of the second logic circuit, the voltage raising circuit operates only when the plurality of control input signals are in the particular state but unless otherwise does not operate, and therefore, unnecessary operations of the voltage raising circuit are eliminated and consumption power is further reduced. Other effects are similar to those according to the first invention.

In the high-frequency switch circuit according to the second invention, the plurality of switching field-effective transistors have a structure which selectively causes one path out of a plurality of signal paths for sending and a plurality of signal paths for receiving which lead to an antenna to conduct in accordance with the states of the plurality of control input signals. In this structure, the first logic circuit selectively causes one of the plurality of signal paths for sending to conduct when the plurality of control input signals enter the particular state, and the first logic circuit selectively causes one of the other remaining signal paths for sending or one of the plurality of signal paths for receiving to conduct when the plurality of control input signals enter other state than the particular state.

Where this structure is used, the voltage raising circuit operates when one signal path for sending out of the plurality of signal paths for sending, namely, the signal path for sending which requires control of high power is to conduct, and when other signal paths for sending which do not require control of high power or the plurality of signal paths for receiving are to conduct, the voltage raising circuit stops operating. In consequence, when the sending power may be low, the voltage raising circuit refrains from operating. Hence, it is possible to further reduce consumption power.

Further, in the high-frequency switch circuit according to the second invention, the plurality of switching field-effective transistors are formed on a semiconductor chip of gallium arsenide, the first and the second logic circuits, the voltage raising circuit, the oscillation circuit and the switch are formed on a semiconductor chip of silicon. The semiconductor chip of gallium arsenide and the semiconductor chip of silicon are housed within the same package.

A high-frequency switch circuit according to a third invention comprises: a plurality of switching field-effective transistors; a logic circuit under whose control the plurality of switching field-effective transistors conduct and shut themselves down in accordance with the state of a control input signal which is supplied from outside; a voltage raising circuit which raises a power source voltage, which is applied upon a power source voltage terminal from outside, and supplies the same to the logic circuit as an operating power source voltage; and an oscillation circuit which is capable of switching an oscillation frequency between high and low in accordance with the state of the control input signal. The oscillation circuit supplies an oscillation signal having a high oscillation frequency to the voltage raising circuit when the control input signal enters a particular state and the voltage raising circuit accordingly operates, whereas when the control input signal enters other state than the particular state, the oscillation circuit supplies an oscillation signal having a low oscillation frequency to the voltage raising circuit and the voltage raising circuit accordingly operates.

In this structure, with the oscillation frequency of the oscillation circuit switched to high or low in accordance with the control input signal, the operating frequency of the voltage raising circuit is enhanced only when the control input signal is in the particular state and control of high power is necessary, while when control of high power is not needed, the operating frequency of the voltage raising circuit is lowered. Since the voltage raising circuit consumes less current when operating at a low operating frequency, thereby reducing a consumption current as a whole. Further, since the voltage raising circuit always remain operating, it is possible to ensure a voltage necessary as the operating power source voltage which is to be supplied to the logic circuit, and the operations of the logic circuit and the switching operations of the switching field-effective transistors will not become instable.

In the high-frequency switch circuit according to the third invention, for instance, the plurality of switching field-effective transistors have a structure which selectively causes one path out of a signal path for sending and a signal path for receiving which lead to an antenna to conduct in accordance with the state of the control input signal. In this structure, the logic circuit selectively causes the signal path for sending to conduct when the control input signal enters a particular state, and the logic circuit selectively causes the signal path for receiving to conduct when the control input signal enters other state than the particular state.

Where this structure is used, an output voltage from the voltage raising circuit is high when the signal path for sending which requires control of high power is to conduct, and when the signal path for receiving which does not need control of high power is to conduct, the output voltage from the voltage raising circuit is low.

In addition, in the high-frequency switch circuit according to the third invention, the oscillation circuit has a structure that an oscillation frequency is determined by a parallel circuit, which is formed by a first resistor and a series circuit of a second resistor and a switch, and a capacitor for instance. The switch opens and closes under control in such a manner that the oscillation frequency will become high when the control input signal enters a particular state but will become low when the control input signal enters other state than the particular state.

Alternatively, in the high-frequency switch circuit according to the third invention, the oscillation circuit has a structure that an oscillation frequency is determined by a parallel circuit, which is formed by a first capacitor and a series circuit of a second capacitor and a switch, and a resistor for example. The switch opens and closes under control in such a manner that the oscillation frequency will become high when the control input signal enters a particular state but will become low when the control input signal enters other state than the particular state.

Further, in the high-frequency switch circuit according to the third invention, plurality of switching field-effective transistors are formed on a semiconductor chip of gallium arsenide, the logic circuit, the voltage raising circuit and the oscillation circuit are formed on a semiconductor chip of silicon. The semiconductor chip of gallium arsenide and the semiconductor chip of silicon are housed within the same package.

A high-frequency switch circuit according to a fourth invention comprises: a plurality of switching field-effective transistors; a first logic circuit under whose control the plurality of switching field-effective transistors conduct and shut themselves down in accordance with the states of a plurality of control input signals which are supplied from outside; a voltage raising circuit which raises a power source voltage, which is applied upon a power source voltage terminal from outside, and supplies the same to the first logic circuit as an operating power source voltage; an oscillation circuit which is capable of switching an oscillation frequency between high and low and which supplies an oscillation signal to the voltage raising circuit and makes the voltage raising circuit operate; and a second logic circuit which switches the oscillation frequency of the oscillation circuit to a high frequency when the plurality of control input signals enter a particular state, and switches the oscillation frequency of the oscillation circuit to a low frequency when the plurality of control input signals enter other state than the particular state.

Where this structure is used, the second logic circuit makes an output voltage from the voltage raising circuit high only when the plurality of control input signals are in the particular state but low unless otherwise, and therefore, unnecessary operations of the voltage raising circuit are eliminated and consumption power is further reduced.

In the high-frequency switch circuit according to the fourth invention, for example, the plurality of switching field-effective transistors have a structure which selectively causes one path out of a plurality of signal paths for sending and a plurality of signal paths for receiving which lead to an antenna to conduct in accordance with the states of the plurality of control input signals. In this structure, the first logic circuit selectively causes one of the plurality of signal paths for sending to conduct when the plurality of control input signals enter a particular state, and the first logic circuit selectively causes one of the other remaining signal paths for sending or one of the plurality of signal paths for receiving to conduct when the plurality of control input signals enter other state than the particular state.

Where this structure is used, an output voltage from the voltage raising circuit is high when one signal path for sending out of the plurality of signal paths for sending, namely, the signal path for sending which requires control of high power is to conduct, and when other signal paths for sending which do not require control of high power or the plurality of signal paths for receiving are to conduct, the output voltage from the voltage raising circuit is low.

In the high-frequency switch circuit according to the fourth invention, the oscillation circuit has a structure that an oscillation frequency is determined by a parallel circuit, which is formed by a first resistor and a series circuit of a second resistor and a switch, and a capacitor. The second logic circuit controls the switch to open or close such that the oscillation frequency will become high when the plurality of control input signals enter a particular state, and when the plurality of control input signals enter other state than the particular state, the second logic circuit controls the switch to open or close such that the oscillation frequency will become low.

Alternatively, in the high-frequency switch circuit according to the fourth invention, the oscillation circuit has a structure that an oscillation frequency is determined by a parallel circuit, which is formed by a first capacitor and a series circuit of a second capacitor and a switch, and a resistor. The second logic circuit controls the switch to open or close such that the oscillation frequency will become high when the plurality of control input signals enter a particular state, and when the plurality of control input signals enter other state than the particular state, the second logic circuit controls the switch to open or close such that the oscillation frequency will become low.

Further, in the high-frequency switch circuit according to the fourth invention, the plurality of switching field-effective transistors are formed on a semiconductor chip of gallium arsenide, the first and the second logic circuits, the voltage raising circuit and the oscillation circuit are formed on a semiconductor chip of silicon. The semiconductor chip of gallium arsenide and the semiconductor chip of silicon are housed within the same package.

A mobile telecommunications terminal device according to a fifth invention comprises: at least one antenna, at least one sender part which outputs a send signal to the at least one antenna, at least one receiver part which receives a receive signal from the at least one antenna, and a plurality of switching field-effective transistors which are connected between the at least one antenna, the at least one sender part and the at least one receiver part; a logic circuit under whose control the plurality of switching field-effective transistors conduct and shut themselves down in accordance with the state of a control input signal which is supplied from outside;

a voltage raising circuit which raises a power source voltage, which is applied upon a power source voltage terminal from outside, and supplies the same to the logic circuit as an operating power source voltage; and an oscillation circuit which operates, supplies an oscillation signal to the voltage raising circuit and makes the voltage raising circuit operate when the control input signal enters a particular state, but stops operating and stops the voltage raising circuit when the control input signal enters other state than the particular state; and a switch which is connected between the power source voltage terminal and an output terminal of the voltage raising circuit, characterized in that the switch is disconnected when the control input signal enters the particular state, and the switch conducts when the control input signal enters other state than the particular state.

This structure gives rise to similar effects to those according to the first invention.

A mobile telecommunications terminal device according to a sixth invention comprises: at least one antenna, at least one sender part which outputs a send signal to the at least one antenna, at least one receiver part which receives a receive signal from the at least one antenna, and a plurality of switching field-effective transistors which are connected between the at least one antenna, the at least one sender part and the at least one receiver part; a first logic circuit under whose control the plurality of switching field-effective transistors conduct and shut themselves down in accordance with the states of a plurality of control input signals which are supplied from outside; a voltage raising circuit which raises a power source voltage, which is applied upon a power source voltage terminal from outside, and supplies the same to the first logic circuit as an operating power source voltage; an oscillation circuit which supplies an oscillation signal to the voltage raising circuit and makes the voltage raising circuit operate; a switch which is connected between the power source voltage terminal and an output terminal of the voltage raising circuit; and a second logic circuit which makes the oscillation circuit operate and disconnects the switch when the plurality of control input signals enter a particular state, but stops the oscillation circuit and causes the switch to conduct when the plurality of control input signals enter other state than the particular state.

This structure gives rise to similar effects to those according to the second invention.

A mobile telecommunications terminal device according to a seventh invention comprises: at least one antenna, at least one sender part which outputs a send signal to the at least one antenna, at least one receiver part which receives a receive signal from the at least one antenna, and a plurality of switching field-effective transistors which are connected between the at least one antenna, the at least one sender part and the at least one receiver part; a logic circuit under whose control the plurality of switching field-effective transistors conduct and shut themselves down in accordance with the state of a control input signal which is supplied from outside; a voltage raising circuit which raises a power source voltage, which is applied upon a power source voltage terminal from outside, and supplies the same to the logic circuit as an operating power source voltage; and an oscillation circuit which is capable of switching an oscillation frequency between high and low in accordance with the state of the control input signal, characterized in that an oscillation signal having a high oscillation frequency is supplied to the voltage raising circuit when the control input signal enters a particular state and the voltage raising circuit accordingly operates, whereas when the control input signal enters other state than the particular state, an oscillation signal having a low oscillation frequency is supplied to the voltage raising circuit and the voltage raising circuit accordingly operates.

This structure gives rise to similar effects to those according to the third invention.

A mobile telecommunications terminal device according to an eighth invention comprises: at least one antenna, at least one sender part which outputs a send signal to the at least one antenna, at least one receiver part which receives a receive signal from the at least one antenna, and a plurality of switching field-effective transistors which are connected between the at least one antenna, the at least one sender part and the at least one receiver part; a first logic circuit under whose control the plurality of switching field-effective transistors conduct and shut themselves down in accordance with the states of a plurality of control input signals which are supplied from outside; a voltage raising circuit which raises a power source voltage, which is applied upon a power source voltage terminal from outside, and supplies the same to the first logic circuit as an operating power source voltage; an oscillation circuit which is capable of switching an oscillation frequency between high and low and which supplies an oscillation signal to the voltage raising circuit and makes the voltage raising circuit operate; and a second logic circuit which switches the oscillation frequency of the oscillation circuit to a high frequency when the plurality of control input signals enter a particular state, but switches the oscillation frequency of the oscillation circuit to a low frequency when the plurality of control input signals enter other state than the particular state.

This structure gives rise to similar effects to those according to the fourth invention.

As described above, by means of the high-frequency switch circuits according to the first and the second inventions and the mobile telecommunications terminal devices according to the fifth and the sixth inventions, the operations of the oscillation circuit is controlled in accordance with the control input signal, thereby making it possible for the voltage raising circuit to operate only when the control input signal is in the particular state and control of high power is necessary. This realizes an excellent high-frequency switch circuit and an excellent mobile telecommunications terminal device with which it is possible to reduce a consumption current. Further, since the power source voltage is supplied to the logic circuit (the first invention) or the first logic circuit (the second invention) when the voltage raising circuit is not in operation, it is possible to ensure a voltage needed by the logic circuit or the first logic circuit for operations when control of high power is not necessary.

Further, by means of the high-frequency switch circuit according to the third invention and the mobile telecommunications terminal device according to the seventh invention, the oscillation frequency of the oscillation circuit is switched to high or low in accordance with the control input signal, and hence, the operating frequency of the voltage raising circuit is enhanced only when the control input signal is in the particular state and control of high power is necessary, but lowered unless otherwise. This realizes an excellent high-frequency switch circuit and an excellent mobile telecommunications terminal device with which it is possible to reduce a consumption current. Further, since this does not demand to stop the operations of the voltage raising circuit, it is possible to ensure a voltage needed by the logic circuit for operations when control of high power is not necessary, and moreover, a switch which supplies the power source voltage directly to the logic circuit is not needed, thereby simplifying the structure.

Still further, by means of the high-frequency switch circuit according to the fourth invention and the mobile telecommunications terminal device according to the eighth invention, the oscillation frequency of the oscillation circuit is switched to high or low in accordance with the control input signal, and hence, the operating frequency of the voltage raising circuit is enhanced only when control of high power is necessary, but lowered unless otherwise. This realizes an excellent high-frequency switch circuit and an excellent mobile telecommunications terminal device with which it is possible to reduce a consumption current. Further, since this does not demand to stop the operations of the voltage raising circuit, it is possible to ensure a voltage needed by the first logic circuit for operations when control of high power is not necessary, and moreover, a switch which supplies the power source voltage directly to the first logic circuit is not needed, thereby simplifying the structure.

BRIEF DESCRIPTION OF THE DRAWINGS

FIG. 4 is a truth table which shows a switching operation of the antenna switch semiconductor integrated circuit according to the first preferred embodiment of the present invention;

Figure 1:
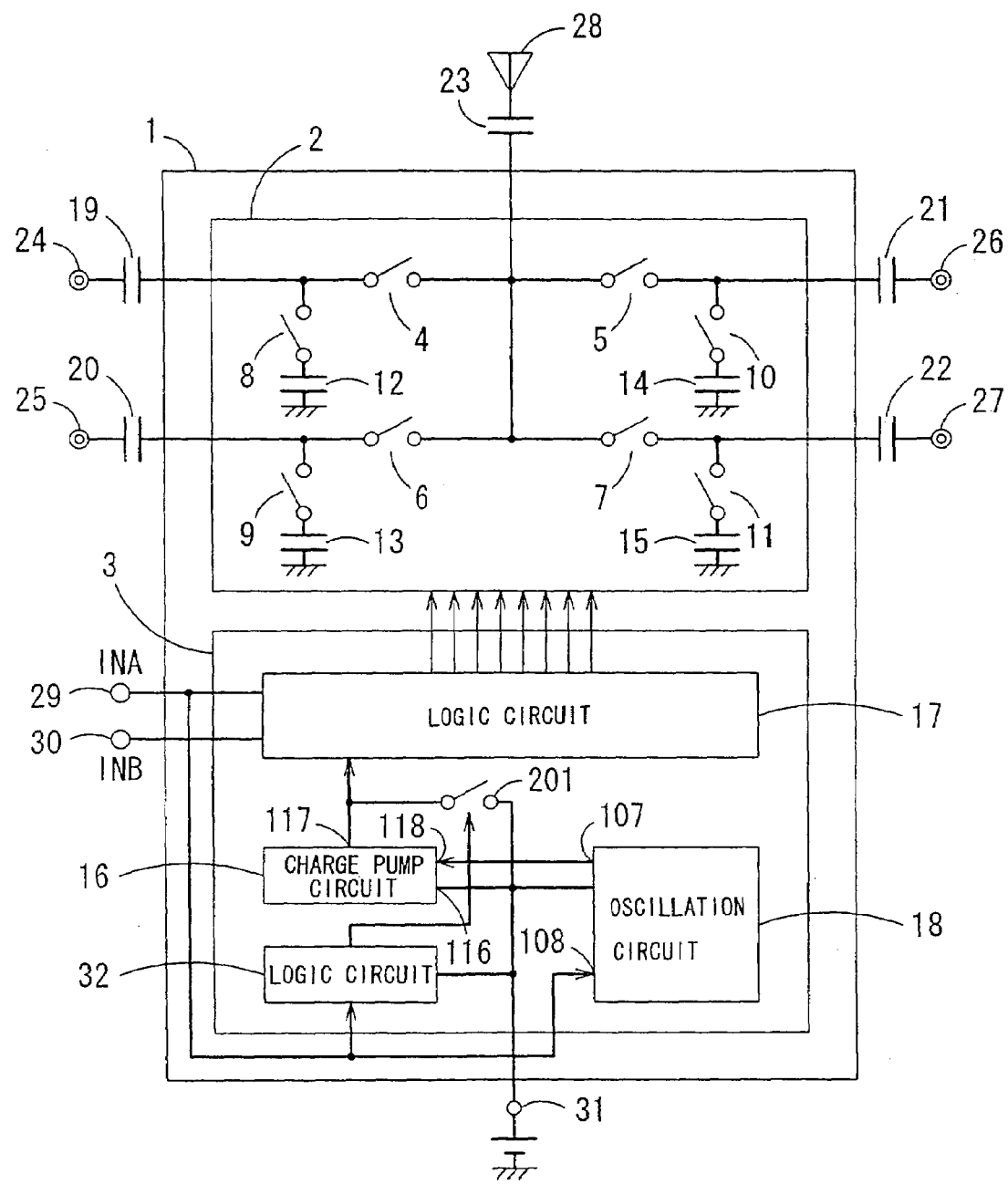
FIG. 1 is a block diagram which shows the structure of an antenna switch semiconductor integrated circuit according to a first preferred embodiment of the present invention.

BEST MODE FOR IMPLEMENTING THE INVENTION (First Preferred Embodiment)

As a first preferred embodiment of a high-frequency switch circuit according to the present invention, an antenna switch semiconductor integrated circuit will now be described with reference to FIG. 1. Like the conventional antenna switch semiconductor integrated circuit shown in FIG. 13, the antenna switch semiconductor integrated circuit of this preferred embodiment is comprised of a GaAs semiconductor chip 2 of gallium arsenide (GaAs) and an Si semiconductor chip 3 of silicon (Si) which are mounted within the same IC package.

Seated on the GaAs semiconductor chip 2 are switches 4 through 11 are formed by GaAsFETs and capacitors 12 through 15 which are similar to those used in the conventional example. Further, a MOS-type logic circuit 17, a voltage raising circuit 16 and an oscillation circuit 18 are formed on the Si semiconductor chip 3. On the Si semiconductor chip 3, there also are a switch 201 which short-circuits a power source voltage terminal 31 with an output terminal of the voltage raising circuit 16 and a logic circuit 32 which is used for control of operations of the switch 201. The switch 201 is a semiconductor switch formed by a MOSFET or a bipolar transistor for instance.

While the foregoing has described that MOS-type integrated circuits are used as the logic circuits 17 and 32, silicon bipolar integrated circuits may be used, or alternatively, silicon BiCMOS integrated circuits may be used.

To be more specific, the switches 4 through 11 form an antenna switch on the GaAs semiconductor chip 2. The switches 4 through 11 on the GaAs semiconductor chip 2, namely, GaASFETs are connected with output terminals of the logic circuit 17 which is disposed on the Si semiconductor chip 3 which is present within the same package. It is accordingly possible to control turning on and off of the switches 4 through 11 in accordance with an output signal from the logic circuit 17.

Next, there are the logic circuit 17, the voltage raising circuit 16, the oscillation circuit 18, the logic circuit 32 and the switch 201 on the Si semiconductor chip 3.

Figure 2:
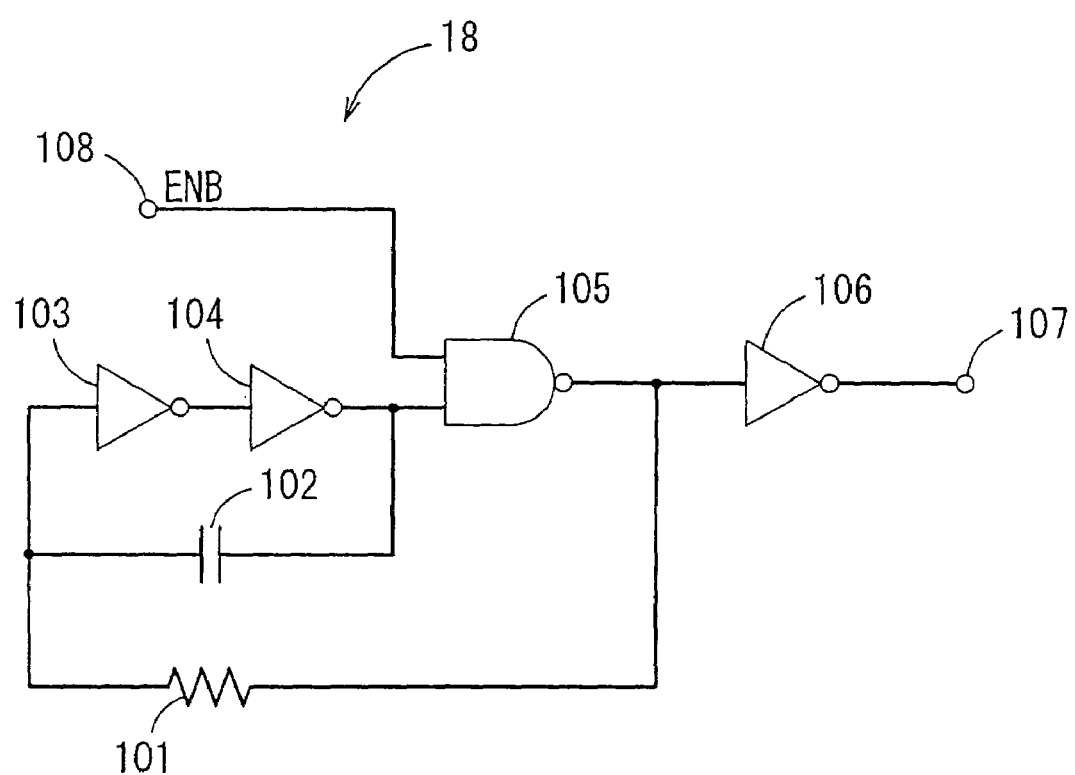
FIG. 2 is a circuitry diagram which shows an example of an equivalent circuit to an oscillation circuit in the antenna switch semiconductor integrated circuit according to the first preferred embodiment of the present invention.

A voltage raising circuit of the charge pump type is used as the voltage raising circuit 16. The oscillation circuit 18 is necessary for the voltage raising circuit 16 to operate. FIG. 2 shows one example of an equivalent circuit to the oscillation circuit 18.

The oscillation circuit 18 comprises three invertors 103, 104 and 106, an AND circuit 105, a resistor 101 and a capacitor 102. These elements generate an oscillation signal, and this signal is outputted at an output terminal 107. The oscillation circuit 18 also comprises a terminal (ENB) 108 which makes the oscillation circuit 18 itself operate or stop the oscillation circuit 18. The oscillation circuit 18 operates when the same voltage as a power source voltage is applied to the terminal 108, and the oscillation circuit 18 stops when the terminal 108 is grounded.

Figure 3:
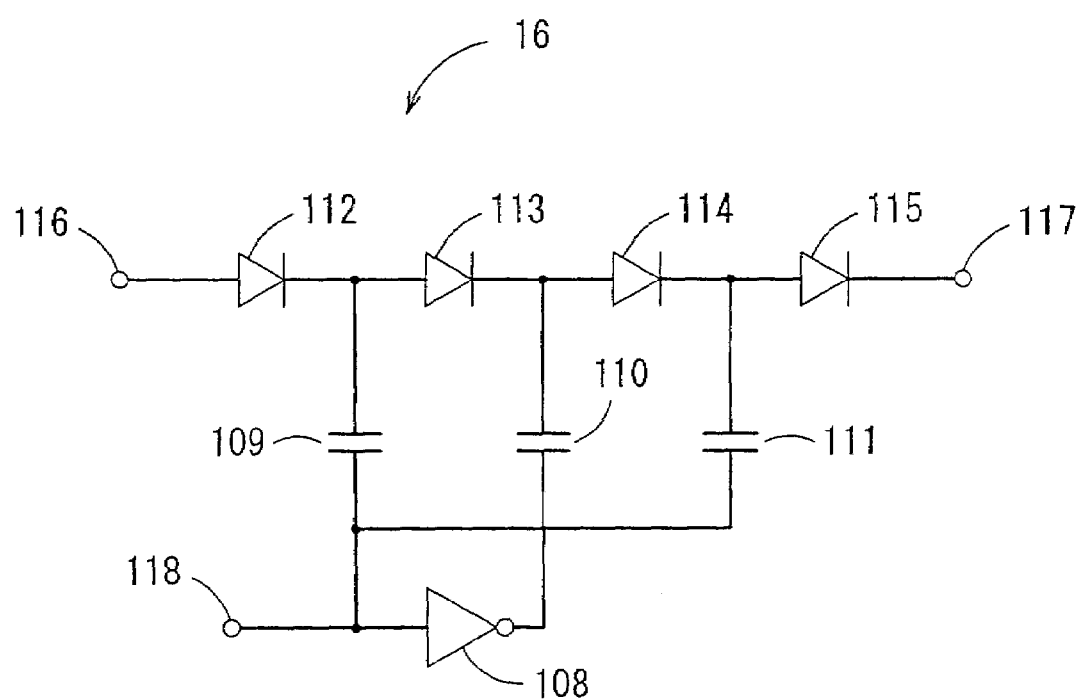
FIG. 3 is a circuitry diagram which shows an example of an equivalent circuit to a voltage raising circuit in the antenna switch semiconductor integrated circuit according to the first preferred embodiment of the present invention.

Next, FIG. 3 shows an example of an equivalent circuit to the voltage raising circuit 16. The voltage raising circuit 16 comprises an input terminal 118 which is connected with the output terminal 107 of the oscillation circuit 18, an invertor 108, capacitors 109 through 111 and diodes 112 through 115.

Figure 13:
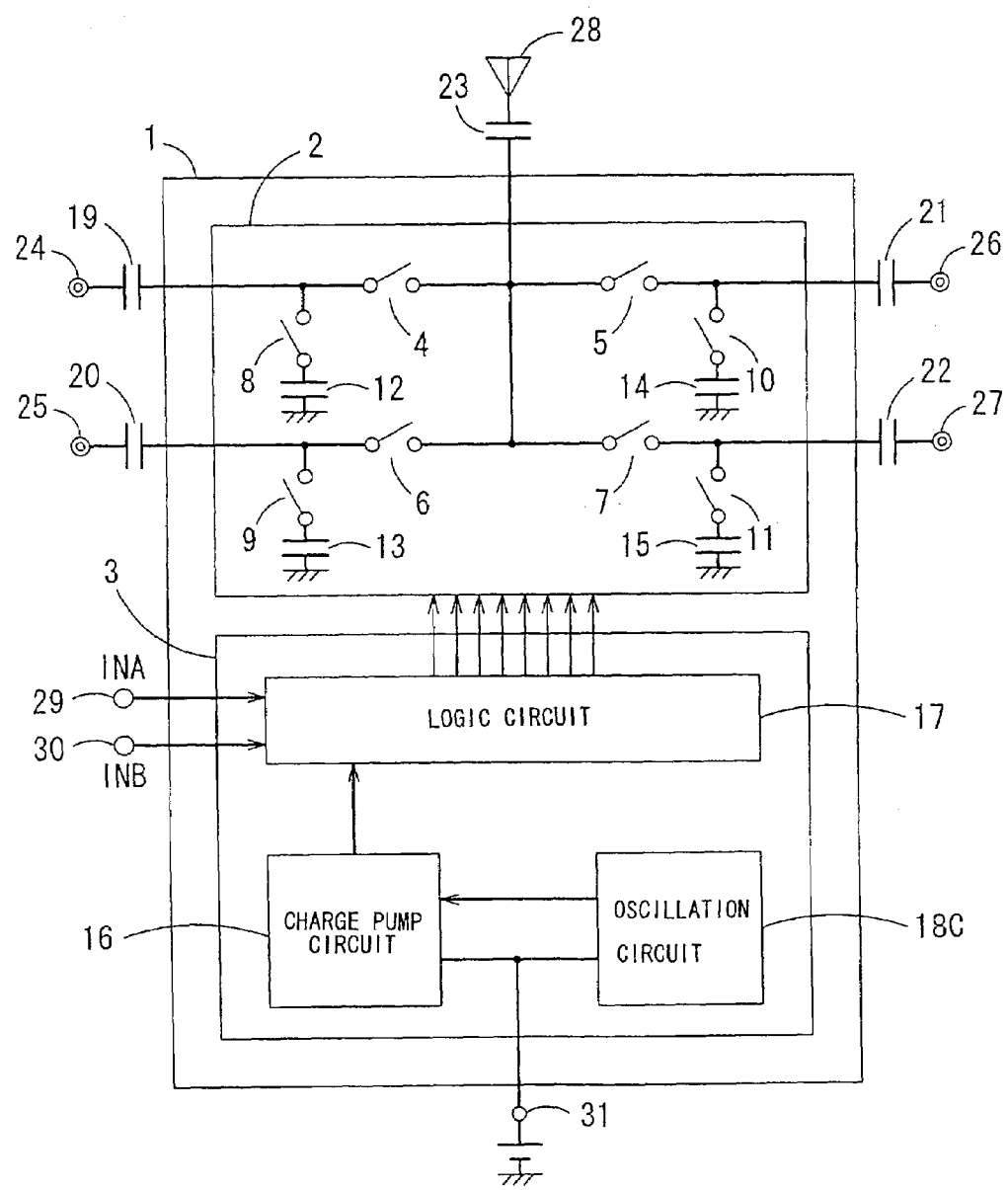
FIG. 13 is a block diagram which shows the structure of a conventional antenna switch semiconductor integrated circuit.

The voltage raising circuit 16 raises a voltage supplied through a power source voltage terminal 116 and outputs thus raised voltage to an output terminal 117. The voltage raising circuit according to the conventional example shown in FIG. 13 is similar to the one shown in FIG. 3.

Where this voltage raising circuit 16 is used, the voltage outputted to the output terminal 117 (Vcp) is expressed by the formula below:

$$Vcp=\alpha*(n+1)*(Vcc-Vd)$$

where α: coefficient,
n: the number of stages within the voltage raising circuit,
Vcc: power source voltage, and
Vd: the amount of a voltage drop in the diode portion.

The number of the stages is the same as the number of the capacitors, and the voltage raising circuit 16 shown in FIG. 3 has three stages. The number of the stages within the voltage raising circuit however is not limited to three.

According to this method, when such a voltage raising circuit 16 is used, it is possible to obtain a desired voltage by changing the number of the stages within the voltage raising circuit 16 and the power source voltage Vcc.

This structure allows, by means of use of the voltage raising circuit 16, to obtain an antenna switch semiconductor integrated circuit which remains operable even at the time of sending that demands high power. On the contrary, in the structure according to the conventional example in which a raised voltage is fed to the logic circuit 17, a large amount of a power source current flows since the voltage raising circuit 16 is always operating, which is not preferable for a mobile telephone or the like which requires reduction in consumption power.

The formula expressing the voltage Vcp above is applicable to where there is no change in oscillation frequency. Where there is a change in oscillation frequency, the voltage Vcp is expressed by the formula below:

$$Vcp=k*f*(n+1)*(Vcc-Vd)$$

where k denotes a coefficient and f denotes the frequency.

FIG. 4 is a truth table which shows how a plurality of control input signals INA and INB which are to be supplied to control terminals 29 and 30 must be and how gate terminal control voltages at the respectively corresponding switches 4 through 11 must be for signal paths between a first through a fourth external signal terminals 24 through 27 and an antenna 28 in FIG. 1 to conduct. There are the first through the fourth external signal terminals 24 through 27 disposed as FIG. 1 shows, so as to be able to deal with high-frequency switch circuits which correspond to mobile telecommunications terminal devices of the dual-band type which are equipped with a sender part and a receiver part for each mode.

In FIG. 4, when the path between the first external signal terminal 24 and the antenna 28 is to conduct and the other paths are to be shut down, the control input signals INA and INB are turned to H and H, respectively. This makes the gate terminal control voltages at the switches 4 through 11 outputted from the logic circuit 17 turn to H, L, L, L, L, H, H and H, and makes the switches 4 through 11 turn to ON, OFF, OFF, OFF, OFF, ON, ON and ON.

Next, when the path between the second external signal terminal 25 and the antenna 28 is to conduct and the other paths are to be shut down, the control input signals INA and INB are turned to H and L, respectively. This makes the gate terminal control voltages at the switches 4 through 11 outputted from the logic circuit 17 turn to L, L, H, L, H, H, L and H, and makes the switches 4 through 11 turn to OFF, OFF, ON, OFF, ON, ON, OFF and ON.

Next, when the path between the third external signal terminal 26 and the antenna 28 is to conduct and the other paths are to be shut down, the control input signals INA and INB are turned to L and H, respectively. This makes the gate terminal control voltages at the switches 4 through 11 outputted from the logic circuit 17 turn to L, H, L, L, H, L, H and H, and makes the switches 4 through 11 turn to OFF, ON, OFF, OFF, ON, OFF, ON and ON.

Next, when the path between the fourth external signal terminal 27 and the antenna 28 is to conduct and the other paths are to be shut down, the control input signals INA and INB are turned to L and L, respectively. This makes the gate terminal control voltages at the switches 4 through 11 outputted from the logic circuit 17 turn to L, L, L, H, H, H, H and L, and makes the switches 4 through 11 turn to OFF, OFF, OFF, ON, ON, ON, ON and OFF.

In this truth table, the path from the first external signal terminal to the antenna and the path from the second external signal terminal to the antenna are for sending, and the path from the third external signal terminal to the antenna and the path from the fourth external signal terminal to the antenna are for receiving.

As one can see from this table, at the time of sending which requires control of high power, the control input signal INA applied upon the control terminal 29 is always at the high voltage (H). In other words, the state of the control input signal INA fed to the control terminal 29 from outside denotes switching between sending and receiving. Use of the control input signal INA therefore makes it possible to operate and stop the voltage raising circuit 16.

However, if the control input signal INA is supplied as the signal ENB to the terminal 108 (See FIG. 2.) which is for making the oscillation circuit 18 operate or stop, the following problem will occur. That is, when the oscillation circuit 18 is in operation, the raised voltage is outputted from the voltage raising circuit 16. As the oscillation circuit 18 stops operating, the voltage raising operation of the voltage raising circuit 16 stops and the output from the voltage raising circuit 16 becomes lower than the power source voltage Vcc. Because of this, the control voltage fed to the gate terminals of the switches 4 through 11 decreases.

Since the voltage raising circuit 16 is a series circuit of diodes, the voltage drops down 0.7 V each. Hence, even when the power source voltage is 3 V, the output voltage from the voltage raising circuit 16 decreases by the amount equivalent to the number of the diodes. Hence, in a structure which requires 3 V of the gate control voltage for receiving, when the gate control voltage becomes 1 V or lower for instance owing to the drop-down mentioned above, it becomes impossible to turn on the switches.

To avoid this, it is necessary that the switch 201 is connected between the power source voltage terminal 31 and the output terminal of the voltage raising circuit 16, and that when the control input signal INA becomes L, the switch 201 is turned on and the power source voltage terminal 31 conducts with the output terminal of the voltage raising circuit 16. This ensures to supply the power source voltage directly to the logic circuit 17 from the power source voltage terminal 31 without using the diodes of the voltage raising circuit 16, when the voltage raising circuit 16 is not operating. As a result, the gate control voltage at the logic circuit 17 reaches the power source voltage, which in turn allows to operate the logic circuit 17 at the power source voltage.

In the structure described above, the voltage raising circuit 16 is allowed to operate when it is necessary to control high output power, but when high output power is not needed, the voltage raising circuit 16 stops operating. In this fashion, consumption power is reduced when a high output is not necessary, and further, operations at the power source voltage are possible.

Figure 5:
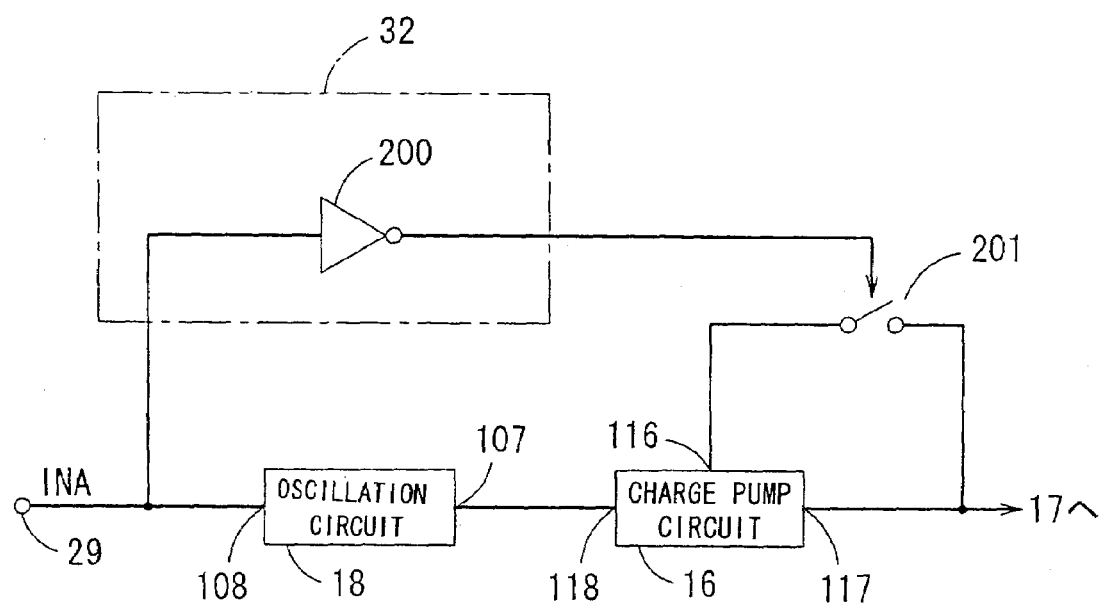
FIG. 5 is a circuitry diagram which shows an example of an equivalent circuit to a logic circuit 32 in the antenna switch semiconductor integrated circuit according to the first preferred embodiment of the present invention.

FIG. 5 shows an example of an equivalent circuit to the logic circuit 32. In FIG. 5, the oscillation circuit 18 and the voltage raising circuit 16 are similar to those according to the conventional example. The control terminal 29 is connected with the terminal 108 which is for making the oscillation circuit 18 operate or stop. The control input signal INA received at the control terminal 29 is fed as the signal ENB to the oscillation circuit 18. The logic circuit 32 is formed by an invertor 200.

As described earlier in relation to the table in FIG. 4, since the control input signal INA is H at the time of sending, the signal ENB at the terminal 108 is H, the oscillation circuit 18 operates and the voltage raising circuit 16 operates.

Meanwhile, since the control input signal INA is L at the time of receiving, the signal ENB at the terminal 108 is L, the oscillation circuit 18 stops operating and the voltage raising circuit 16 stops operating. The output voltage from the output terminal 117 of the voltage raising circuit 16 decreases during receiving, and therefore, the power source voltage terminal 116 and the output terminal 117 of the voltage raising circuit 16 become connected via the switch 201.

The switch 201 is controlled to open and close in response to a signal which is obtained as the control input signal INA is reversed by the invertor 200. Because of this, when the control input signal INA is H, the control signal fed to the switch 201 becomes L. Hence, the output terminal 117 of the voltage raising circuit 16 fails to get connected with the power source voltage terminal 116.

On the contrary, when the control input signal INA is L, the control signal fed to the switch 201 becomes H. This makes the output terminal 117 of the voltage raising circuit 16 connected with the power source voltage terminal 116, whereby even when the voltage raising circuit 16 is not in operation, the power source voltage Vcc is supplied to the logic circuit 17.

In this manner, the oscillation circuit 18 operates or stops operating in accordance with the control input signal INA, the voltage raising circuit 16 operates only at the time of sending, and when the voltage raising circuit 16 is not in operation, the power source voltage is supplied. This realizes an antenna switch semiconductor integrated circuit in which the voltage raising circuit 16 operates only at the time of sending.

In the antenna switch semiconductor integrated circuit according to this preferred embodiment, the voltage raising circuit 16 operates only at the time of sending which requires control of high power and the raised voltage is supplied to the logic circuit 17, while at the time of receiving which does not require control of high power, the power source voltage is supplied to the logic circuit 17 without operating the voltage raising circuit 16, thereby reducing consumption power. Further, when the voltage raising circuit 16 is not in operation, the switch 201 turns on, the power source voltage terminal 31 accordingly conduct with the output terminal of the voltage raising circuit 16 and the power source voltage is supplied directly to the logic circuit 17, and therefore, the operating power source voltage supplied to the logic circuit 17 will not become lower than the power source voltage which is supplied from outside. For this reason, the operations of the logic circuit 17 and the switching operations of the switches 4 through 11 will not become instable.

Where it is possible to intermittently control the switch 201 directly by means of the control input signal INA, the logic circuit 32 may be omitted.

(Second Preferred Embodiment)

A second preferred embodiment of the present invention will now be described with reference to FIGS. 6 and 7. As for a difference of the second preferred embodiment from the first preferred embodiment, while the voltage raising circuit 16 is always in operation at the time of sending in the first preferred embodiment, the voltage raising circuit 16 is prohibited from operating when the sending output is low even during sending in the second preferred embodiment.

The following condition may occur in the truth table in FIG. 4. For example, a high sending output is necessary for the path between the first external signal terminal 24 and the antenna 28 and a raised voltage is needed to control the same. In the meantime, the sending output is low in the path between the second external signal terminal 25 and the antenna 28, and therefore, this path can be controlled sufficiently by means of the power source voltage even without using the voltage raising circuit 16.

Under such a condition, the voltage raising circuit 16 does not need to operate for sending over the path between the second external signal terminal 25 and the antenna 28.

Noting this, even for the purpose of the sending above, the structure that prevents the voltage raising circuit 16 from operating is used when the sending is to take place in the path between the second external signal terminal 25 and the antenna 28. This further reduces a consumption current. FIGS. 6 and 7 show a circuit structure for this.

Figure 6:
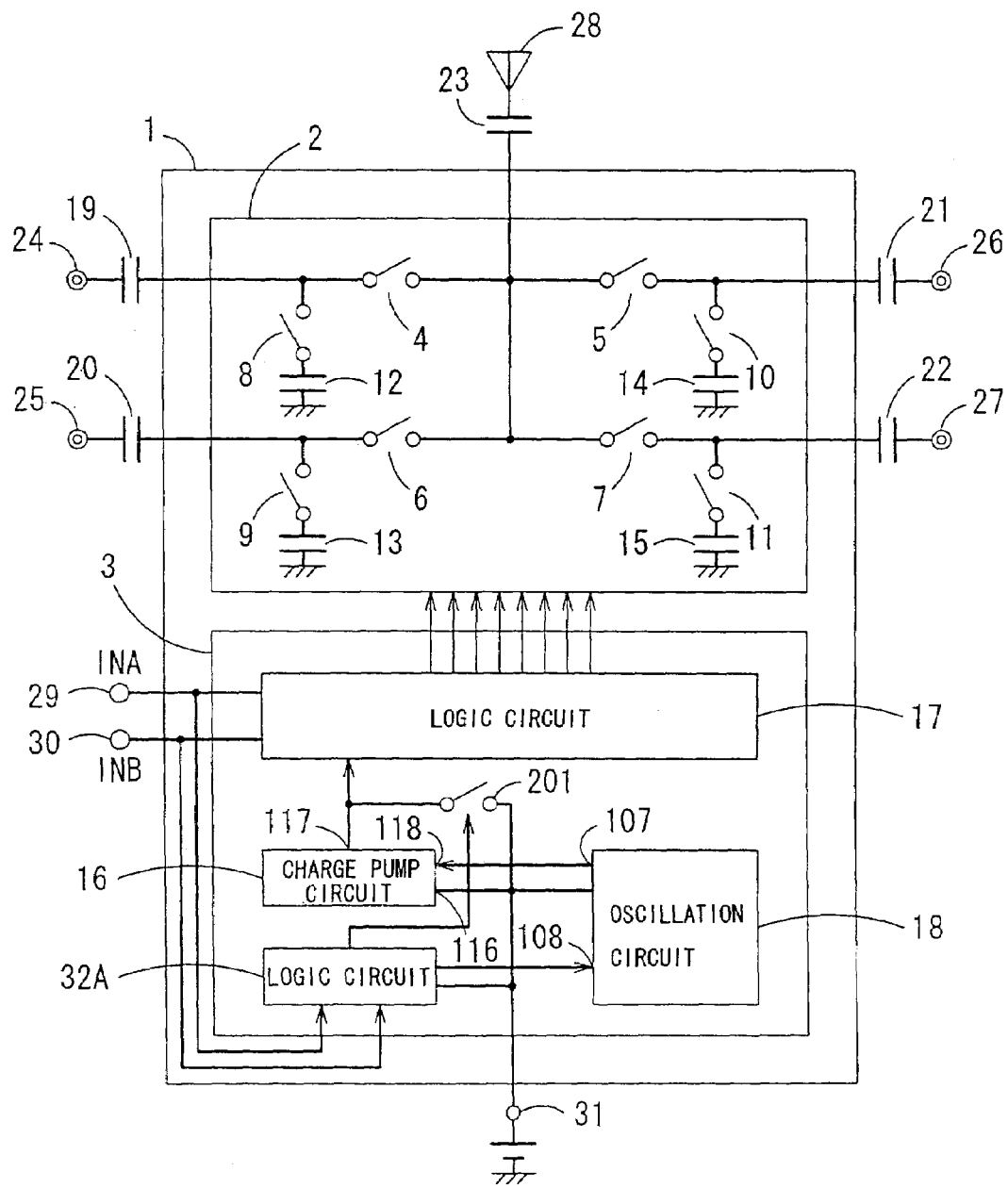
FIG. 6 is a block diagram which shows the structure of an antenna switch semiconductor integrated circuit according to a second preferred embodiment of the present invention.
Figure 7:
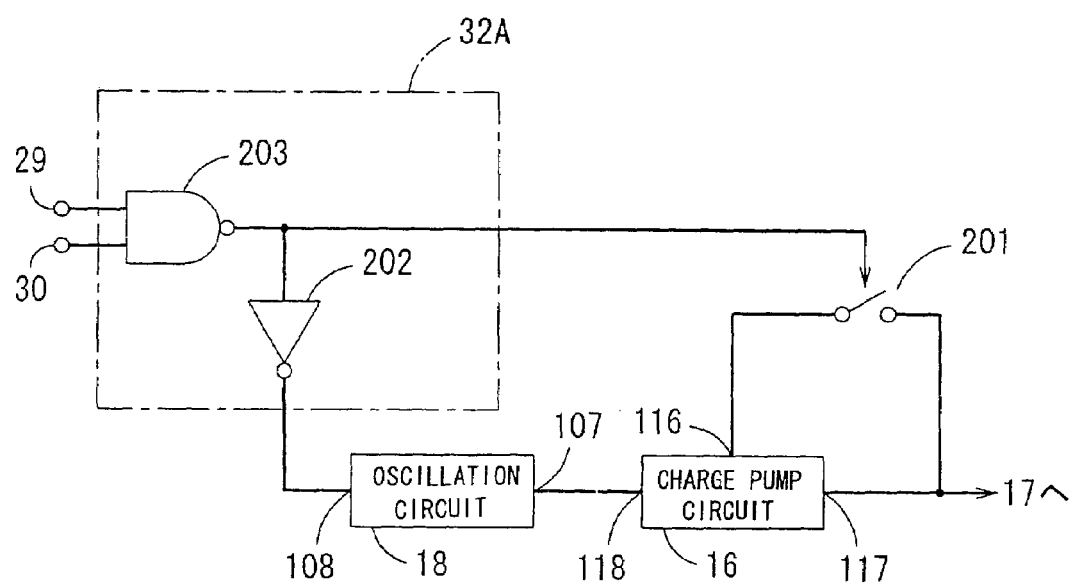
FIG. 7 is a circuitry diagram which shows an example of an equivalent circuit to a logic circuit 32A in the antenna switch semiconductor integrated circuit according to the second preferred embodiment of the present invention.

In FIGS. 6 and 7, the oscillation circuit 18 and the voltage raising circuit 16 are the same as those used in the first preferred embodiment. A difference from the first preferred embodiment is that the structure of a logic circuit 32A is different from that used in the first preferred embodiment. In other words, according to this embodiment, as shown in FIGS. 6 and 7, the control input signals INA and INB are fed to a NAND circuit 203, an output signal from the NAND circuit 203 is fed to an invertor 202, an output signal from the invertor 202 is fed as the signal ENB to the terminal 108, and the switch 201 is controlled to turn on and off in accordance with the output signal from the NAND circuit 203. This is different from direct supplying of the control input signal INA to the terminal 108 which is performed according to the first preferred embodiment shown in FIG. 1.

In this structure, as shown in the truth table in FIG. 4, the oscillation circuit 18 operates and stops operating merely as both the control input signal INA and the control input signal INB become H. Hence, it is possible to operate the oscillation circuit 18 only when the path between the first external signal terminal 24 and the antenna 28 is to serve as a signal path, thereby raising the power source voltage.

Meanwhile, when the other paths than the path between the first external signal terminal 24 and the antenna 28 are to be chosen, as shown in the truth table in FIG. 4, since turning of both the control input signal INA and the control input signal INB to H will never occur, the output signal from the NAND circuit 203 will always be H. Use of the output signal from the NAND circuit 203 as a control signal for the switch 201, which connects the power source voltage terminal 116 with the output terminal 117 of the voltage raising circuit, therefore causes the power source voltage to be supplied to the logic circuit 17 when the oscillation circuit 18 has stopped operating.

This is a structure that the oscillation circuit 18 operates and stops operating in accordance with the control input signal INA and the control input signal INB, the voltage raising circuit 16 operates only for sending with high power in particular during sending but stops operating at the time of sending with low power or at the time of receiving, and the power source voltage is supplied to the logic circuit 17 directly when the voltage raising circuit 16 is not in operation. This realizes an antenna switch semiconductor integrated circuit in which the voltage raising circuit 16 operates only when a high output signal needs be controlled even at the time of sending.

This embodiment, owing to the structure that the voltage raising circuit 16 operates only for sending with high power in particular during sending but stops operating at the time of sending with low power or at the time of receiving, and the power source voltage is supplied to the logic circuit 17 when the voltage raising circuit 16 is not in operation, attains a further reduction of the consumption power as compared to the first preferred embodiment.

(Third Preferred Embodiment)

A third preferred embodiment of the present invention will now be described with reference to FIG. 8. A difference of the third preferred embodiment from the first preferred embodiment is that instead of switching the oscillation circuit 18 between operations and non-operation, the oscillation frequency of an oscillation circuit 18A is switched in accordance with the state of the control input signal INA, using a logic circuit 32B. Another difference from the first preferred embodiment is that the switch 201 and the logic circuit which controls the same are omitted. Further, with respect to the terminal 108, such a structure that the oscillation circuit 18A, applied with the power source voltage, is always in operation is used, which is similar to the conventional example. The logic circuit 32B mentioned above has a structure which turns on switches 204 and 205 at the time of sending.

Where it is possible to switch the oscillation frequency of the oscillation circuit 18A by means of the control input signal INA directly, the logic circuit 32B may be omitted.

The third preferred embodiment demands that the oscillation frequency of the oscillation circuit 18A is changed to thereby control the raised voltage. The voltage at the voltage raising circuit 16 changes along with the oscillation frequency of the oscillation circuit 18A. When the oscillation frequency is high, the raised voltage is high, whereas when the oscillation frequency is low, the raised voltage is low. Hence, as the oscillation frequency is changed, the raised voltage is changed. Lowering of the oscillation frequency reduces the number of the switchings and hence the consumption current, and therefore, even when the voltage raising circuit 16 is in operation, the consumption current is reduced.

Figure 8:
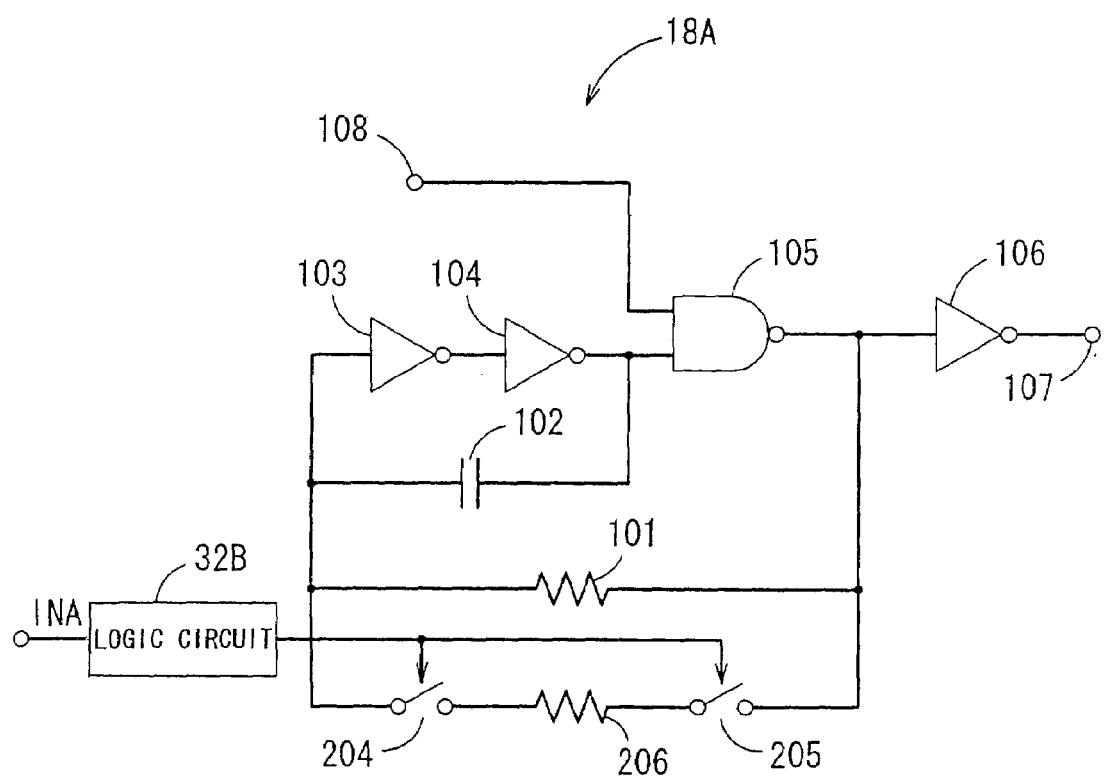
FIG. 8 is a circuitry diagram which shows an example of an equivalent circuit to an oscillation circuit 18A in an antenna switch semiconductor integrated circuit according to a third preferred embodiment of the present invention.

The structure of the oscillation circuit 18A shown in FIG. 8 is the same as that of the oscillation circuit 18 shown in FIG. 2 as it is modified such that a series circuit formed by the switch 204, a resistor 206 and the switch 205 is connected parallel to the resistor 101. The logic circuit 32B controls turning on and off of the switches 204 and 205. The structure described above allows to select either a state that the oscillating operation is achieved using only the resistor 101 or a state that the switches 204 and 205 are ON, the resistor 206 is connected parallel to the resistor 101 and the oscillating operation is achieved using thus reduced resistance values. The switches 204 and 205 are formed by semiconductor switches formed by MOSFETs or bipolar transistors for instance.

The values of the resistors disposed within the oscillation circuit 18A are changed in this manner, thereby obtaining oscillation frequencies desirable respectively for sending which demands high power and receiving which merely needs low power. The switches 204 and 205 are for switching, through use of the logic circuit 32B which is similar to that described earlier in relation to the first preferred embodiment, between a state that demands a high voltage and a state that a low voltage is sufficient. Lowering the oscillation frequency and accordingly decreasing the consumption current, this structure provides an antenna switch semiconductor integrated circuit which generally needs only a low consumption current.

Further, the circuit according to the first preferred embodiment requires to additionally use the circuit (switch 201) which outputs the power source voltage as is for the purpose of supplying the operating power to the logic circuit 17, and since the switch 201 for high power takes up a large space on the substrate, the circuit size becomes large. In contrast, according to the third preferred embodiment, either the capacitance value or the resistance value may be changed when the oscillation frequency is to be determined, and hence, the resistor 206 and the switches 204 and 205 which are used to change the oscillation frequency carry only a very small current. This provides an advantage that this circuit takes up merely a small space on the substrate and the circuit size can accordingly be small.

(Fourth Preferred Embodiment)

A fourth preferred embodiment of the present invention will now be described with reference to FIG. 9. A difference of the fourth preferred embodiment from the second preferred embodiment is that instead of switching the oscillation circuit 18 between operations and non-operation, the oscillation frequency of an oscillation circuit 18A is switched in accordance with the states of the control input signals INA and INB, using a logic circuit 32C. Another difference from the second preferred embodiment is that the switch 201 and the logic circuit which controls the same are omitted. Further, with respect to the terminal 108, such a structure that the oscillation circuit 18A, applied with the power source voltage, is always in operation is used, which is similar to the conventional example. The logic circuit 32C has a structure which turns on the switches 204 and 205 only for sending with high power in particular during sending. In other cases, the switches 204 and 205 are turned off.

The fourth preferred embodiment demands that the oscillation frequency of the oscillation circuit 18A is changed to thereby control the raised voltage. The voltage at the voltage raising circuit 16 changes along with the oscillation frequency of the oscillation circuit 18A. When the oscillation frequency is high, the raised voltage is high, whereas when the oscillation frequency is low, the raised voltage is low. Hence, as the oscillation frequency is changed, the raised voltage is changed. Lowering of the oscillation frequency reduces the number of the switchings and hence the consumption current, and therefore, even when the voltage raising circuit 16 is in operation, the consumption current is reduced.

Figure 9:
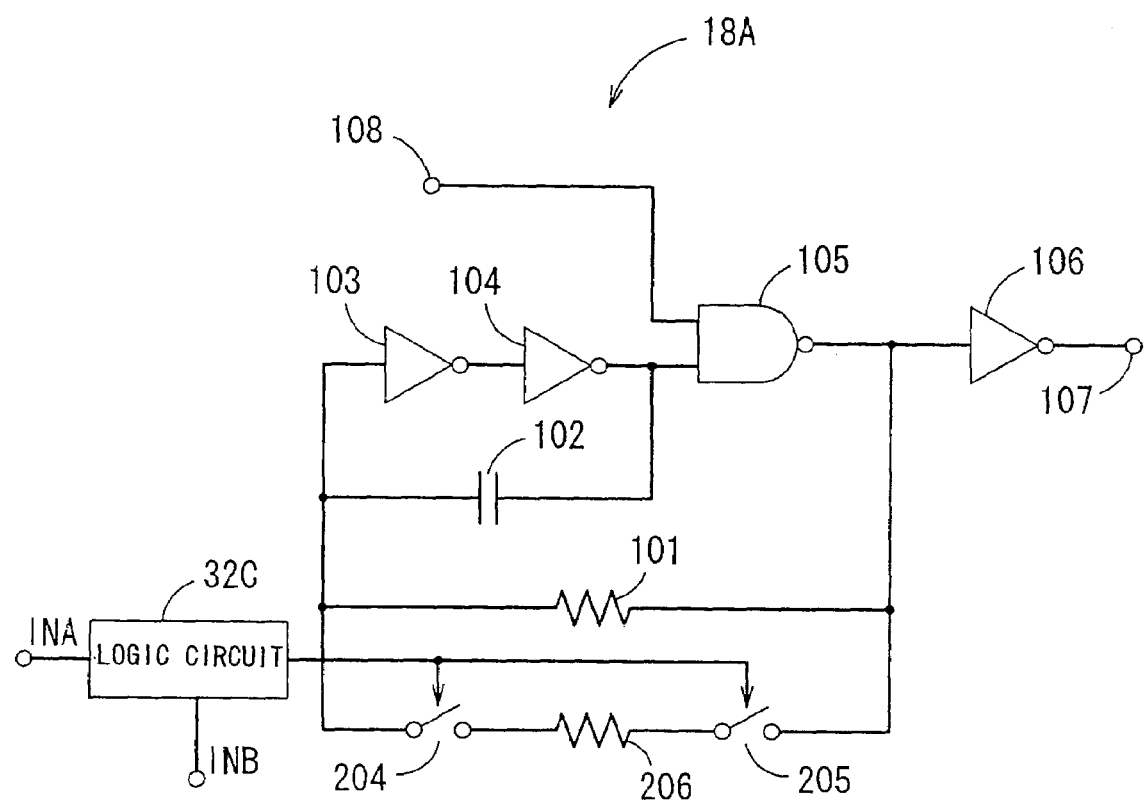
FIG. 9 is a circuitry diagram which shows an example of an equivalent circuit to an oscillation circuit 18A in an antenna switch semiconductor integrated circuit according to a fourth preferred embodiment of the present invention.

The structure of the oscillation circuit 18A shown in FIG. 9 is the same as that of the oscillation circuit 18 shown in FIG. 2 as it is modified such that a series circuit formed by the switch 204, the resistor 206 and the switch 205 is connected parallel to the resistor 101. The logic circuit 32C controls turning on and off of the switches 204 and 205. The structure described above allows to select either a state that the oscillating operation is achieved with the resistor 101 alone or a state that the switches 204 and 205 are ON, the resistor 206 is connected parallel to the resistor 101 and the oscillating operation is achieved using thus reduced resistance values.

The values of the resistors disposed within the oscillation circuit 18A are changed in this manner, thereby obtaining oscillation frequencies desirable respectively for sending which demands high power, sending for which low power is enough and receiving which merely needs low power. The switches 204 and 205 are for switching, through use of the logic circuit 32C which is similar to that described earlier in relation to the second preferred embodiment, between a state that demands a high voltage and a state that a low voltage is sufficient. Lowering the oscillation frequency and accordingly decreasing the consumption current, this structure realizes an antenna switch semiconductor integrated circuit which generally needs only a low consumption current.

Further, the circuit according to the second preferred embodiment requires to additionally use the circuit (switch 201) which outputs the power source voltage as is for the purpose of supplying the operating power to the logic circuit 17, and since the switch 201 for high power takes up a large space on the substrate, the circuit size becomes large. In contrast, according to the fourth preferred embodiment, either the capacitance value or the resistance value may be changed when the oscillation frequency is to be determined, and hence, the resistor 206 and the switches 204 and 205 which are used to change the oscillation frequency carry only a very small current. This provides an advantage that this circuit takes up merely a small space on the substrate and the circuit size can accordingly be small.

(Fifth Preferred Embodiment)

Figure 10:
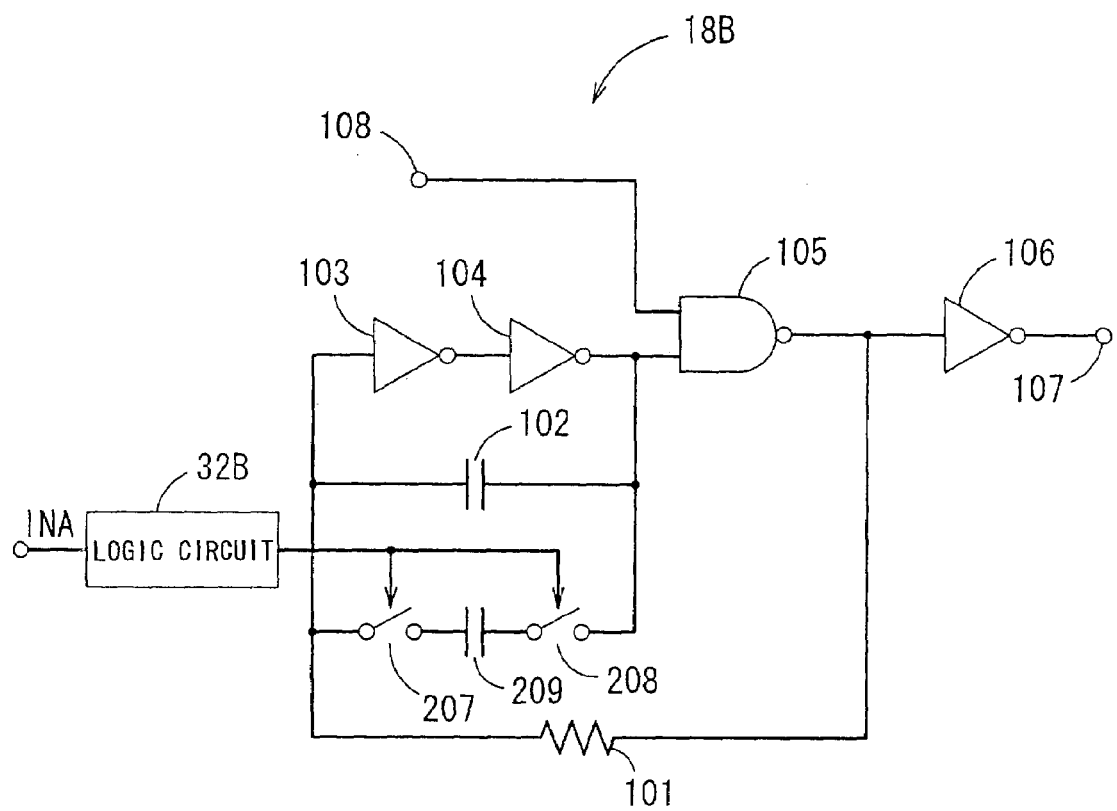
FIG. 10 is a circuitry diagram which shows an example of an equivalent circuit to an oscillation circuit 18B in an antenna switch semiconductor integrated circuit according to a fifth preferred embodiment of the present invention.

A fifth preferred embodiment of the present invention will now be described with reference to FIG. 10. A difference of the fifth preferred embodiment from the third preferred embodiment is that the oscillation frequency of an oscillation circuit 18B is switched as a capacitance is switched. In other words, a series circuit formed by a switch 207, a capacitor 209 and a switch 208 is connected parallel to the capacitor 102, and as the logic circuit 32B controls turning on and off of the switches 207 and 208, the oscillation frequency of an oscillation circuit 18B is switched between high and low. The switches 207 and 208 are formed by semiconductor switches formed by MOSFETs or bipolar transistors for instance. The other structures and effects are similar to those according to the third preferred embodiment.

(Sixth Preferred Embodiment)

Figure 11:
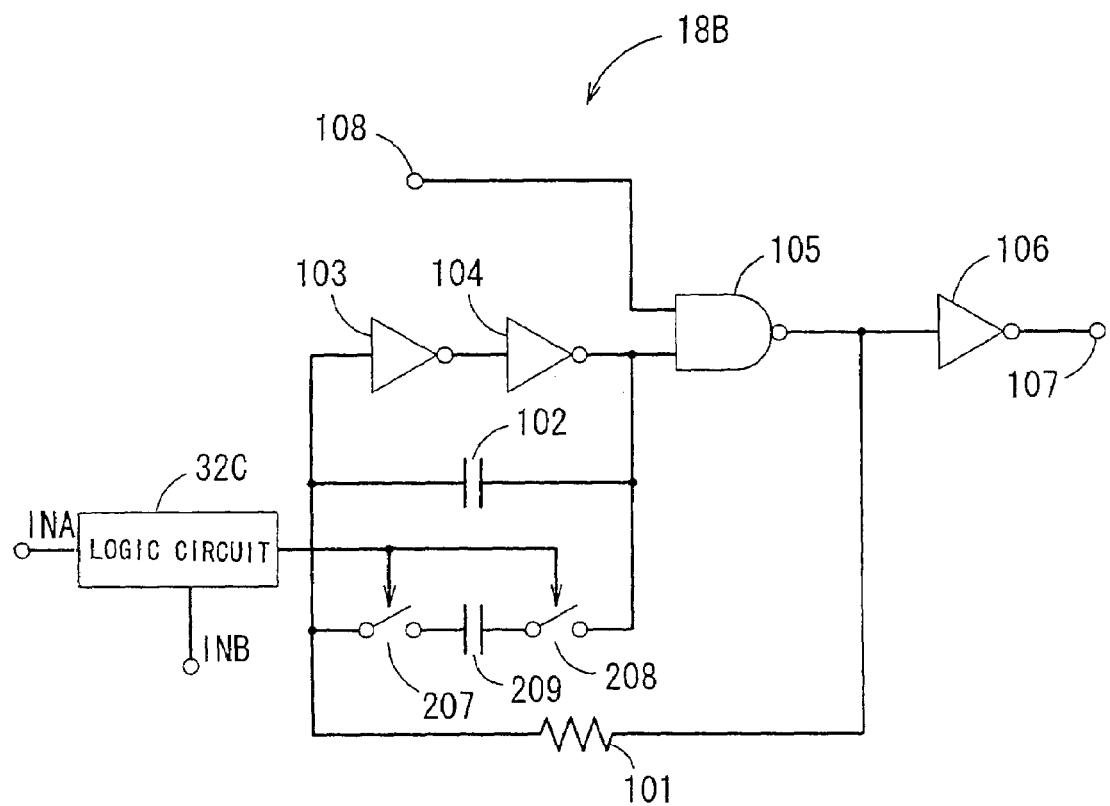
FIG. 11 is a circuitry diagram which shows an example of an equivalent circuit to an oscillation circuit 18B in an antenna switch semiconductor integrated circuit according to a sixth preferred embodiment of the present invention.

A sixth preferred embodiment of the present invention will now be described with reference to FIG. 11. A difference of the sixth preferred embodiment from the fourth preferred embodiment is that the oscillation frequency of an oscillation circuit 18B is switched as a capacitance is switched. In other words, a series circuit formed by the switch 207, the capacitor 209 and the switch 208 is connected parallel to the capacitor 102, and as the logic circuit 32C controls turning on and off of the switches 207 and 208, the oscillation frequency of an oscillation circuit 18B is switched between high and low. The other structures and effects are similar to those according to the fourth preferred embodiment.

(Seventh Preferred Embodiment)

A seventh preferred embodiment of the present invention will now be described with reference to FIG. 12. The seventh preferred embodiment is directed to a mobile telecommunications terminal device which uses the high-frequency switch circuit according to the first preferred embodiment.

Figure 12:
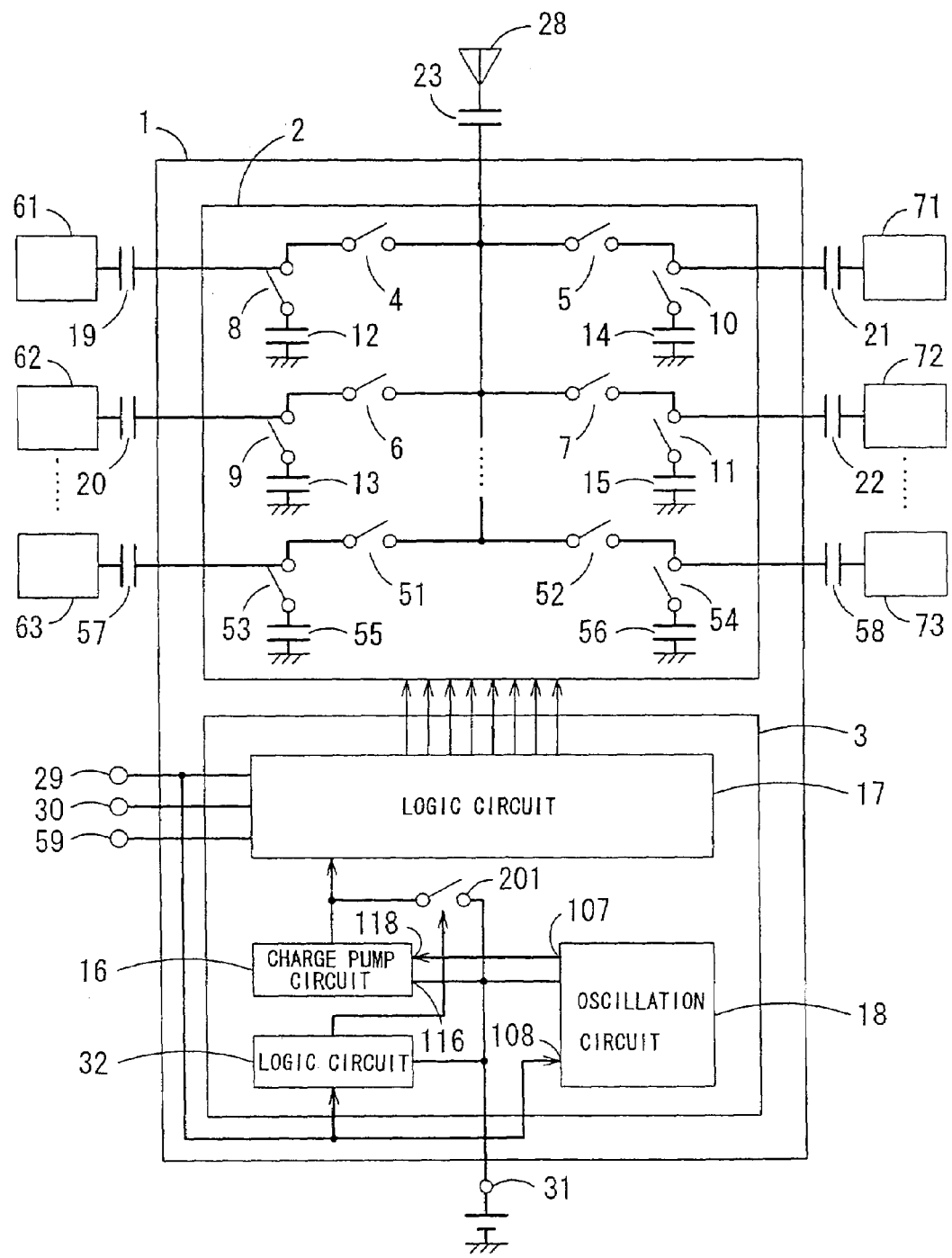
FIG. 12 is a block diagram which shows the structure of a mobile telecommunications terminal device according to a seventh preferred embodiment of the present invention.

In FIG. 12, an IC package 1 basically has the same structure as that of the high-frequency switch circuit described earlier in relation to the first preferred embodiment. However, the high-frequency switch circuit according to the first preferred embodiment comprises the four external signal terminals 24 through 27 and selects one path from among the four signal paths. In this case, two sender parts and two receiver parts are connected to each one of the four external signal terminals 24 through 27, for example.

However, in the mobile telecommunications terminal device according to the seventh preferred embodiment, n receiver parts 61 through 63 (where n is any desired integer) are connected with the IC package 1 via capacitors 19, 20 and 57 and n sender parts 71 through 73 are connected with the IC package 1 via capacitors 21, 22 and 58, which permits one path out of 2×n signal paths to selectively conduct.

The n-th receiver part 63 is connected with one end of a switch 51 via the capacitor 57, while the n-th sender part 73 is connected with one end of a switch 52 via the capacitor 58. The other ends of the switches 51 and 52 are connected with the antenna 28 via a capacitor 23. Switches 53 and 54 and capacitors 55 and 56 have the same functions as those of the switches 8 through 11 and the capacitors 12 through 15.

The logic circuit 17 also has such a circuit structure which selectively operate one path out of 2×n signal paths between the n receiver parts 61 through 63, the n sender parts 71 through 73 and the antenna 28, and to adapt to this, the number of the control terminals 29, 30 . . . 59 is greater.

While operations inside the IC package 1 are as described earlier in relation to the first preferred embodiment and will not therefore be described in detail, as the switch 4 is turned on, the switches 5 through 7, 51 and 52 are turned off, the switch 8 is turned off and the switches 9 through 11, 53 and 54 are turned on for instance, the signal path between the receiver part 61 and the antenna 28 conducts and the other signal paths get disconnected.

In a similar manner, as the switch 5 is turned on, the switches 4, 6, 7, 51 and 52 are turned off, the switch 10 is turned off and the switches 8, 9, 11, 53 and 54 are turned on, the signal path between the sender part 71 and the antenna 28 conducts and the other signal paths get disconnected.

The effect according to this preferred embodiment is similar to that according to the first preferred embodiment.

While the above has described the mobile telecommunications terminal device which uses the high-frequency switch circuit according to the first preferred embodiment, use of the high-frequency switch circuits according to the second through the sixth preferred embodiments also realizes a mobile telecommunications terminal device as in the seventh preferred embodiment.

In addition, although this preferred embodiment uses only one antenna, it is easy to form a mobile telecommunications terminal device using a plurality of antennas. In that case, the switches 4 through 11, 8 through 11 and the capacitors 12 through 16 and the like are disposed to each one of the plurality of antennas in a similar fashion to where only one antenna is used, and the structure of the logic circuit 17 is accordingly changed.

What is claimed is:

1. A high-frequency switch circuit, comprising:
a plurality of switching field-effective transistors;
a logic circuit under whose control said plurality of switching field-effective transistors conduct and shut themselves down in accordance with the state of a control input signal which is supplied from outside;

a voltage raising circuit which raises a power source voltage, which is applied upon a power source voltage terminal from outside, and supplies the same to said logic circuit as an operating power source voltage;

an oscillation circuit which operates, supplies an oscillation signal to said voltage raising circuit and makes said voltage raising circuit operate when said control input signal enters a particular state, but stops operating and stops said voltage raising circuit when said control input signal enters other state than said particular state; and a switch which is connected between said power source voltage terminal and an output terminal of said voltage raising circuit, characterized in that said switch is disconnected when said control input signal enters said particular state, and said switch conducts when said control input signal enters other state than said particular state.

2. The high-frequency switch circuit of claim 1, characterized in that said plurality of switching field-effective transistors have a structure which selectively causes one path out of a signal path for sending and a signal path for receiving which lead to an antenna to conduct in accordance with the state of said control input signal, said logic circuit selectively causes said signal path for sending to conduct when said control input signal enters said particular state, and said logic circuit selectively causes said signal path for receiving to conduct when said control input signal enters other state than said particular state.

3. The high-frequency switch circuit of claim 1 or 2, characterized in that said plurality of switching field-effective transistors are formed on a semiconductor chip of gallium arsenide, said logic circuit, said voltage raising circuit, said oscillation circuit and said switch are formed on a semiconductor chip of silicon, and said semiconductor chip of gallium arsenide and said semiconductor chip of silicon are housed within the same package.

4. A high-frequency switch circuit, comprising:
a plurality of switching field-effective transistors;
a first logic circuit under whose control said plurality of switching field-effective transistors conduct and shut themselves down in accordance with the states of a plurality of control input signals which are supplied from outside;
a voltage raising circuit which raises a power source voltage, which is applied upon a power source voltage terminal from outside, and supplies the same to said first logic circuit as an operating power source voltage;
an oscillation circuit which supplies an oscillation signal to said voltage raising circuit and makes said voltage raising circuit operate;
a switch which is connected between said power source voltage terminal and an output terminal of said voltage raising circuit; and
a second logic circuit which makes said oscillation circuit operate and disconnect said switch when said plurality of control input signals enter a particular state, but stops said oscillation circuit and causes said switch to conduct when said plurality of control input signals enter other state than said particular state.

5. The high-frequency switch circuit of claim 4, characterized in that said plurality of switching field-effective transistors have a structure which selectively causes one path out of a plurality of signal paths for sending and a plurality of signal paths for receiving which lead to an antenna to conduct in accordance with the states of said plurality of control input signals, said first logic circuit selectively causes one of said plurality of signal paths for sending to conduct when said plurality of control input signals enter said particular state, and said first logic circuit selectively causes one of the other remaining signal paths for sending or one of said plurality of signal paths for receiving to conduct when said plurality of control input signals enter other state than said particular state.

6. The high-frequency switch circuit of claim 4 or 5, characterized in that said plurality of switching field-effective transistors are formed on a semiconductor chip of gallium arsenide, said first and said second logic circuits, said voltage raising circuit, said oscillation circuit and said switch are formed on a semiconductor chip of silicon, and said semiconductor chip of gallium arsenide and said semiconductor chip of silicon are housed within the same package.

7. A high-frequency switch circuit, comprising:
a plurality of switching field-effective transistors;
a logic circuit under whose control said plurality of switching field-effective transistors conduct and shut themselves down in accordance with the state of a control input signal which is supplied from outside;
a voltage raising circuit which raises a power source voltage, which is applied upon a power source voltage terminal from outside, and supplies the same to said logic circuit as an operating power source voltage; and
an oscillation circuit which is capable of switching an oscillation frequency between high and low in accordance with the state of said control input signal,
characterized in that an oscillation signal having a high oscillation frequency is supplied to said voltage raising circuit when said control input signal enters a particular state and said voltage raising circuit accordingly operates, whereas when said control input signal enters other state than said particular state, an oscillation signal having a low oscillation frequency is supplied to said voltage raising circuit and said voltage raising circuit accordingly operates.

8. The high-frequency switch circuit of claim 7, characterized in that said plurality of switching field-effective transistors have a structure which selectively causes one path out of a signal path for sending and a signal path for receiving which lead to an antenna to conduct in accordance with the state of said control input signal, said logic circuit selectively causes said signal path for sending to conduct when said control input signal enters a particular state, and said logic circuit selectively causes said signal path for receiving to conduct when said control input signal enters other state than said particular state.

9. The high-frequency switch circuit of claim 7 or 8, characterized in that said oscillation circuit has a structure that an oscillation frequency is determined by a parallel circuit, which is formed by a first resistor and a series circuit of a second resistor and a switch, and a capacitor, said switch opens and closes under control in such a manner that said oscillation frequency will become high when said control input signal enters a particular state but will become low when said control input signal enters other state than said particular state.

10. The high-frequency switch circuit of claim 7 or 8, characterized in that said oscillation circuit has a structure that an oscillation frequency is determined by a parallel circuit, which is formed by a first capacitor and a series circuit of a second capacitor and a switch, and a resistor, said switch opens and closes under control in such a manner that said oscillation frequency will become high when said control input signal enters a particular state but will become low when said control input signal enters other state than said particular state.

11. The high-frequency switch circuit of claim 7 or 8, characterized in that said plurality of switching field-effective transistors are formed on a semiconductor chip of gallium arsenide, said logic circuit, said voltage raising circuit and said oscillation circuit are formed on a semiconductor chip of silicon, and said semiconductor chip of gallium arsenide and said semiconductor chip of silicon are housed within the same package.

12. A high-frequency switch circuit, comprising:
   a plurality of switching field-effective transistors;
   a first logic circuit under whose control said plurality of switching field-effective transistors conduct and shut themselves down in accordance with the states of a plurality of control input signals which are supplied from outside;
   a voltage raising circuit which raises a power source voltage, which is applied upon a power source voltage terminal from outside, and supplies the same to said first logic circuit as an operating power source voltage;
   an oscillation circuit which is capable of switching an oscillation frequency between high and low and which supplies an oscillation signal to said voltage raising circuit and makes said voltage raising circuit operate; and
   a second logic circuit which switches the oscillation frequency of said oscillation circuit to a high frequency when said plurality of control input signals enter a particular state, and switches the oscillation frequency of said oscillation circuit to a low frequency when said plurality of control input signals enter other state than said particular state.

13. The high-frequency switch circuit of claim 12, characterized in that said plurality of switching field-effective transistors have a structure which selectively causes one path out of a plurality of signal paths for sending and a plurality of signal paths for receiving which lead to an antenna to conduct in accordance with the states of said plurality of control input signals, said first logic circuit selectively causes one of said plurality of signal paths for sending to conduct when said plurality of control input signals enter a particular state, and said first logic circuit selectively causes one of the other remaining signal paths for sending or one of said plurality of signal paths for receiving to conduct when said plurality of control input signals enter other state than said particular state.

14. The high-frequency switch circuit of claim 12 or 13, characterized in that said oscillation circuit has a structure that an oscillation frequency is determined by a parallel circuit, which is formed by a first resistor and a series circuit of a second resistor and a switch, and a capacitor, said second logic circuit controls said switch to open or close such that said oscillation frequency will become high when said plurality of control input signals enter a particular state, and when said plurality of control input signals enter other state than said particular state, said second logic circuit controls said switch to open or close such that said oscillation frequency will become low.

15. The high-frequency switch circuit of claim 12 or 13, characterized in that said oscillation circuit has a structure that an oscillation frequency is determined by a parallel circuit, which is formed by a first capacitor and a series circuit of a second capacitor and a switch, and a resistor, said second logic circuit controls said switch to open or close such that said oscillation frequency will become high when said plurality of control input signals enter a particular state, and when said plurality of control input signals enter other state than said particular state, said second logic circuit controls said switch to open or close such that said oscillation frequency will become low.

16. The high-frequency switch circuit of claim 12 or 13, characterized in that said plurality of switching field-effective transistors are formed on a semiconductor chip of gallium arsenide, said first and said second logic circuits, said voltage raising circuit and said oscillation circuit are formed on a semiconductor chip of silicon, and said semiconductor chip of gallium arsenide and said semiconductor chip of silicon are housed within the same package.

17. A mobile telecommunications terminal device, comprising:
   at least one antenna, at least one sender part which outputs a send signal to said at least one antenna, at least one receiver part which receives a receive signal from said at least one antenna, and a plurality of switching field-effective transistors which are connected between said at least one antenna, said at least one sender part and said at least one receiver part;
   a logic circuit under whose control said plurality of switching field-effective transistors conduct and shut themselves down in accordance with the state of a control input signal which is supplied from outside;
   a voltage raising circuit which raises a power source voltage, which is applied upon a power source voltage terminal from outside, and supplies the same to said logic circuit as an operating power source voltage; and
   an oscillation circuit which operates, supplies an oscillation signal to said voltage raising circuit and makes said voltage raising circuit operate when said control input signal enters a particular state, but stops operating and stops said voltage raising circuit when said control input signal enters other state than said particular state; and
   a switch which is connected between said power source voltage terminal and an output terminal of said voltage raising circuit,
   characterized in that said switch is disconnected when said control input signal enters said particular state, and said switch conducts when said control input signal enters other state than said particular state.

18. A mobile telecommunications terminal device, comprising:
   at least one antenna, at least one sender part which outputs a send signal to said at least one antenna, at least one receiver part which receives a receive signal from said at least one antenna, and a plurality of switching field-effective transistors which are connected between said at least one antenna, said at least one sender part and said at least one receiver part;
   a first logic circuit under whose control said plurality of switching field-effective transistors conduct and shut themselves down in accordance with the states of a plurality of control input signals which are supplied from outside;
   a voltage raising circuit which raises a power source voltage, which is applied upon a power source voltage terminal from outside, and supplies the same to said first logic circuit as an operating power source voltage;
   an oscillation circuit which supplies an oscillation signal to said voltage raising circuit and makes said voltage raising circuit operate;

a switch which is connected between said power source voltage terminal and an output terminal of said voltage raising circuit; and a second logic circuit which makes said oscillation circuit operate and disconnects said switch when said plurality of control input signals enter a particular state, but stops said oscillation circuit and causes said switch to conduct when said plurality of control input signals enter other state than said particular state.

19. A mobile telecommunications terminal device, comprising:

at least one antenna, at least one sender part which outputs a send signal to said at least one antenna, at least one receiver part which receives a receive signal from said at least one antenna, and a plurality of switching field-effective transistors which are connected between said at least one antenna, said at least one sender part and said at least one receiver part;

a logic circuit under whose control said plurality of switching field-effective transistors conduct and shut themselves down in accordance with the state of a control input signal which is supplied from outside;

a voltage raising circuit which raises a power source voltage, which is applied upon a power source voltage terminal from outside, and supplies the same to said logic circuit as an operating power source voltage; and an oscillation circuit which is capable of switching an oscillation frequency between high and low in accordance with the state of said control input signal, characterized in that an oscillation signal having a high oscillation frequency is supplied to said voltage raising circuit when said control input signal enters a particular state and said voltage raising circuit accordingly operates, whereas when said control input signal enters other state than said particular state, an oscillation signal having a low oscillation frequency is supplied to said voltage raising circuit and said voltage raising circuit accordingly operates.

20. A mobile telecommunications terminal device, comprising:

at least one antenna, at least one sender part which outputs a send signal to said at least one antenna, at least one receiver part which receives a receive signal from said at least one antenna, and a plurality of switching field-effective transistors which are connected between said at least one antenna, said at least one sender part and said at least one receiver part;

a first logic circuit under whose control said plurality of switching field-effective transistors conduct and shut themselves down in accordance with the states of a plurality of control input signals which are supplied from outside;

a voltage raising circuit which raises a power source voltage, which is applied upon a power source voltage terminal from outside, and supplies the same to said first logic circuit as an operating power source voltage;

an oscillation circuit which is capable of switching an oscillation frequency between high and low and which supplies an oscillation signal to said voltage raising circuit and makes said voltage raising circuit operate; and a second logic circuit which switches the oscillation frequency of said oscillation circuit to a high frequency when said plurality of control input signals enter a particular state, but switches the oscillation frequency of said oscillation circuit to a low frequency when said plurality of control input signals enter other state than said particular state.

* * * * *